(12) United States Patent
Sato et al.

(10) Patent No.: US 7,212,378 B2
(45) Date of Patent: May 1, 2007

(54) THIN FILM MAGNETIC HEAD HAVING TOROIDAL COIL

(75) Inventors: Kiyoshi Sato, Niigata-ken (JP); Sumihito Morita, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 504 days.

(21) Appl. No.: 10/716,743

(22) Filed: Nov. 17, 2003

(65) Prior Publication Data

US 2004/0100727 A1 May 27, 2004

(30) Foreign Application Priority Data

Nov. 22, 2002 (JP) ............................. 2002-339356
Mar. 12, 2003 (JP) ............................. 2003-066248
Aug. 14, 2003 (JP) ............................. 2003-293379

(51) Int. Cl.
G11B 5/147 (2006.01)

(52) U.S. Cl. ..................................... 360/126

(58) Field of Classification Search ................ 360/126, 360/317, 123; 29/603.14
See application file for complete search history.

(56) References Cited

U.S. PATENT DOCUMENTS

| | | | |
|---|---|---|---|
| 5,828,533 A * | 10/1998 | Ohashi et al. | ............... 360/126 |
| 5,995,342 A * | 11/1999 | Cohen et al. | ................ 360/126 |
| 6,256,864 B1 | 7/2001 | Gaud et al. | |
| 6,335,846 B1 | 1/2002 | Gaud et al. | |
| 6,459,543 B1 * | 10/2002 | Sasaki | ......................... 360/126 |
| 6,530,141 B2 * | 3/2003 | Komuro et al. | .......... 29/603.14 |
| 6,624,972 B1 * | 9/2003 | Nishida et al. | ............. 360/126 |
| 6,778,354 B2 * | 8/2004 | Matono | ...................... 360/123 |

FOREIGN PATENT DOCUMENTS

| | | |
|---|---|---|
| JP | 63-31006 | 2/1988 |
| JP | 1-282715 | 11/1989 |
| JP | 4-356707 | 12/1992 |
| JP | 5-250636 | 9/1993 |
| JP | 6-103526 | 4/1994 |

(Continued)

OTHER PUBLICATIONS

Notification of Refusal for corresponding Japanese Patent Application No. 2003-293379.

*Primary Examiner*—Tianjie Chen
(74) *Attorney, Agent, or Firm*—Brinks Hofer Gilson & Lione

(57) ABSTRACT

A thin-film magnetic has a coil toroidally wound around a magnetic layer. The coil includes a plurality of first coil segments that cross over the magnetic layer; a coil insulating layer covering the first coil segments, the magnetic layer being formed on the coil insulating layer; a plurality of second coil segments that cross over the magnetic layer, the second coil segments being formed on the coil insulating layer; and a plurality of bank layers disposed at two sides of the magnetic layer in the track width direction, the bank layers being electrically connected with ends of the first coil segments. Each second coil segment in the track width direction are electrically connected with upper faces of the bank layers to connect ends of the adjacent first coil layers with each other via the second coil segments. According to this structure, the second coil segments can be accurately formed by patterning.

15 Claims, 16 Drawing Sheets

FOREIGN PATENT DOCUMENTS

| | | |
|---|---|---|
| JP | 6-103531 | 4/1994 |
| JP | 11-273028 | 10/1999 |
| JP | 2000-311311 | 11/2000 |
| JP | 2000-322709 | 11/2000 |
| JP | 2001-266309 | 9/2001 |
| JP | 2002-170205 | 6/2002 |

* cited by examiner

THIN FILM MAGNETIC HEAD HAVING TOROIDAL COIL

BACKGROUND OF THE INVENTION

1. Field of the Invention

The present invention relates generally to thin-film recording heads for use in, for example, floating magnetic heads. In particular, it relates to a thin-film magnetic head in which an electrical connection between first coil segments and second coil segments can be easily and reliably formed and in which the second coil segments are properly insulated from a magnetic pole layer.

2. Description of the Related Art

Japanese Unexamined Patent Application Publication Nos. 11-273028, 2000-311311, and 2002-170205 and U.S. Pat. No. 6,335,846 B1 teach inductive recording heads each having a coil layer including a coil toroidally wound around a core.

The coil is preferably toroidal to best utilize the three-dimensional space near the core layer. This structure has been expected to achieve miniaturization of inductive heads and superior magnetic efficiency.

In all the above-described prior art documents, a lower coil layer, which is formed below the core layer, e.g., an upper magnetic pole layer, is electrically connected to an upper coil layer, which is formed above the core layer, via connectors.

For example, Japanese Unexamined Patent Application Publication Nos. 2000-311311 and 2002-17020 teach a structure including through holes each formed across a first insulating layer covering a lower coil layer and each side portion of a second insulating layer extending over the core layer in the track width direction. A connector is formed in each through hole so that the upper face of the connector comes into contact with a side portion of the upper coil layer. Although the above-described patent documents do not include front views of the lower coil layer, the upper coil layer, and the connectors viewed from the face opposing the recording medium (hereinafter referred to as "opposing face"), it can be inferred from the description that the front view is such as that shown in FIG. 20.

As shown in FIG. 20, step differences are formed between the upper face of the core layer and the upper face of the first insulating layer. As a result, step differences are formed in the second insulating layer extending over the core layer. The presence of the step differences degrades the accuracy of patterning in forming the upper coil layer. In particular, the patterned resist formed on the connector is not accurately removed, thereby causing connection failure between the connector and the side portion of the upper coil layer formed in the pattern by plating.

Moreover, in forming the second insulating layer, the material does not readily deposit on the side faces of the core layer due to the step differences. As a result, insulation between each side face of the core layer and the upper coil layer becomes incomplete. The easiest way to overcome these problems is to increase the thickness of the second insulating layer. However, since the total thickness of the first and second insulating layers increases, forming through holes that extend across the first and second insulating layers to come into contact with the upper face of the lower coil layer becomes difficult. As a result, the electrical connection between the lower coil layer and the connectors becomes instable.

SUMMARY OF THE INVENTION

The present invention aims to overcome the problems experienced in the prior art. In particular, an object of the present invention is to easily form a reliable electrical connection between a first coil segment and a second coil segment and to maintain sufficient insulation between the second coil segments and a magnetic pole layer.

To achieve this object, the present invention provides a thin-film magnetic head having an opposing face that opposes a recording medium, the thin-film magnetic head including a lower core layer extending from the opposing face in a height direction; a magnetic layer directly or indirectly connected to the lower core layer at a position a predetermined distance away from the opposing face in the height direction; and a coil toroidally wound around the magnetic layer. The coil includes a plurality of first coil segments that cross over the magnetic layer, the first coil segments being separated from each other with predetermined gaps therebetween in the height direction; a coil insulating layer covering the first coil segments, the magnetic layer being formed on the coil insulating layer; a plurality of second coil segments that cross over the magnetic layer, the second coil segments being formed on the coil insulating layer; and a plurality of bank layers disposed at two sides of the magnetic layer in the track width direction, the bank layers being electrically connected with ends of the first coil segments. Here, ends of each second coil segment in the track width direction are electrically connected with upper faces of the bank layers to connect ends of the adjacent first coil layers with each other via the second coil segments, thereby forming a toroidal coil.

With this structure, the bank layers at the two sides of the magnetic layer that regulates the track width Tw at the opposing face can be formed on the coil insulating layer and are electrically connected to the ends of the second coil segments.

According to this structure, the ends of the second coil segments connected to the ends of the first coil segments can be uplifted due to the presence of the bank layers. Thus, the second coil segments can be formed on a flat face. Thus, the resist for forming the second coil segments can be applied at uniform thickness, and the pattern of the second coil segments can be accurately formed in the resist layer by exposure and development. In particular, the failure of removing resist from the positions corresponding to the ends of the second coil segments can be avoided. Moreover, the ends of the second coil segments can be electrically connected with the upper faces of the bank layer with high reliability and ease.

Moreover, since the ends of the second coil segments are uplifted by the bank layer, the second coil segments can be appropriately insulated from the magnetic layer.

Preferably, the thin-film magnetic head further includes a lower magnetic pole layer formed above the lower core layer and a gap layer including a nonmagnetic metal material formed on the lower magnetic pole layer, the lower magnetic pole layer and the gap layer being formed by plating. Preferably, the magnetic layer is formed on the gap layer and functions as an upper magnetic pole layer; the lower magnetic pole layer, the gap layer, and the magnetic layer constitute a first composite structure; the width of the first composite structure in the track width direction at the opposing face defines a track width Tw; and each banking layer includes a second composite structure including a first sublayer composed of the same material as the lower magnetic pole layer, a second sublayer composed of the same material as the gap layer, and a third sublayer composed of the same material as the magnetic layer.

With this structure, the making of the bank layers can be simplified. In particular, since the gap layer is formed with a nonmagnetic platable metal material, the bank layer containing the sublayer composed of the same material as that of the gap layer can exhibit sufficient conductivity. Thus, the bank layer can sufficiently function as the intermediate layer for connecting the first coil segment to the second coil segment.

In the present invention, the first composite structure may further include an upper core layer on the magnetic layer, the upper core layer having a lower saturation magnetic flux density than that of the magnetic layer and being formed by plating, and the second composite structure may further include a fourth sublayer on the third sublayer, the fourth sublayer composed of the same material as the upper core layer.

According to the present invention, the composite containing the lower magnetic pole layer, the gap layer, and the upper magnetic pole layer, i.e., the magnetic layer, is connected to the lower core layer at two positions, namely, at a position close to the opposing face and at a position remote from the opposing face. Thus, the composite can be formed with flatness on the first coil segments.

Alternatively, the thin-film magnetic head may further include a lower magnetic pole layer on the lower core layer; a gap layer composed of a nonmagnetic metal material and disposed on the lower magnetic pole layer; and an upper magnetic pole layer disposed on the gap layer, wherein the lower magnetic pole layer, the gap layer, and the upper magnetic pole layer are formed by plating and constitute a magnetic pole end layer, wherein a width of the magnetic pole end layer in the track width direction at the opposing face defines a track width Tw, and the magnetic layer is formed on the magnetic pole end layer.

According to this aspect of the present invention, the magnetic pole end layer is formed on an end portion of the lower magnetic core layer at the opposing face side. The magnetic layer functions as the upper core layer for connecting the height-side of the lower core layer to the magnetic pole end layer. The first and second coil segments are wound around the magnetic layer functioning as the upper core layer.

Since the magnetic layer functions as the upper core layer, the magnetic layer preferably has a saturation magnetic flux density lower than that of the upper magnetic pole layer in order to prevent magnetic recording outside the recording track width.

When the magnetic layer functions as the upper core layer, the bank layer is preferably composed of the same material as the magnetic layer.

In the present invention, the bank layer may include a first sublayer composed of the same material as the magnetic layer and an adjustment sublayer stacked on the first sublayer with at least one step difference therebetween. The upper face of the adjustment sublayer may be located at a position higher than the upper face of the upper core layer.

The upper face of each bank layer can be located at a position higher than the upper face of the upper core layer by forming the adjustment sublayer. As a result, the ends of the second coil segments can be electrically connected to the upper faces of the bank layers with high reliability and ease. Moreover, the second coil segments can be properly insulated from the magnetic layer or the upper core layer.

Preferably, the gap layer and the second sublayer are composed of at least one of NiP, NiReP, NiPd, NiW, NiMo, NiRh, Au, Pt, Rh, Pd, Ru, and Cr by plating.

In the present invention, the bank layer may be a composite structure including at least one layer composed of Cu, FeNi, Ni, Au, FeCo, FeCoRh, or FeCoNi and at least one protective layer composed of Ni, CuNi, or NiP. In this case, the bank layers are formed separated from the magnetic layer; however, the options of the materials used in the bank layers become wider, and the bank layers can be formed of a highly conductive nonmagnetic metal material such as Cu. Note that the nonmagnetic metal material such as Cu is readily oxidizable when exposed to air, a protective layer composed of Ni or the like is preferably formed on the nonmagnetic metal layer to prevent oxidization resulting from exposure to air. In this manner, the bank layers can sufficiently function as intermediate layers that connect the first coil segments to the second coil segments.

Alternatively, the bank layer may further include an adjustment sublayer stacked on the composite structure with at least one step difference therebetween, wherein an upper face of the adjustment sublayer is located at a position higher than the upper face of the magnetic layer. In this manner, the upper faces of the bank layers can be easily located at a position higher than that of the upper face of the magnetic layer. The ends of the second coil segments can be electrically connected to the upper faces of the bank layers with high reliability and ease. The second coil segments can be properly insulated from the magnetic layer.

In the present invention, each bank layer may have a uniform cross-sectional area over the entire length. The bank layer may be composed of an insulating material and have a single-layer or multilayer structure. The upper face of the bank layer may be located at a position higher than that of the upper face of the magnetic layer.

In the present invention, the distance between an end of the first coil segment and an adjacent end of the adjacent first coil segment is preferably larger than the minimum distance between the adjacent first coil segments in a region where the first coil segments overlap the magnetic layer, and this relationship is satisfied in at least one set of adjacent first coil segments.

In an inductive thin-film magnetic head, the inductance is preferably reduced by minimizing the volume of the magnetic circuit in which a magnetic flux flows. Thus, the length of the magnetic layer in the height direction must be decreased, and the distance between the first coil segments in the region overlapping the magnetic layer must be decreased. Meanwhile, the ends of the first coil segments can be reliably and easily connected to the ends of the second coil segments by increasing the distance between the ends of the first coil segments as is in the present invention.

Preferably, the first coil segments have portions parallel to each other in the region where the first coil segments overlap the magnetic layer to stabilize the magnetic field induced from the coil to the magnetic layer.

For the same reason above, the distance between an end of the second coil segment and an adjacent end of the adjacent second coil segment is preferably larger than the minimum distance between the adjacent second coil segments in a region where the second coil segments overlap the magnetic layer, and this relationship is satisfied in at least one set of adjacent second coil segments.

In this case also, the second coil segments preferably have portions parallel to each other in the region where the second coil segments overlap the magnetic layer.

Preferably, the length of the second coil segment in a first direction orthogonal to the direction of electric current is larger than the length of the first coil segment in the first direction to minimize heat generation from the coil. More preferably, the thickness of the second coil segment is larger than the thickness of the first coil segment.

DESCRIPTION OF THE PREFERRED EMBODIMENTS

Figure 1:
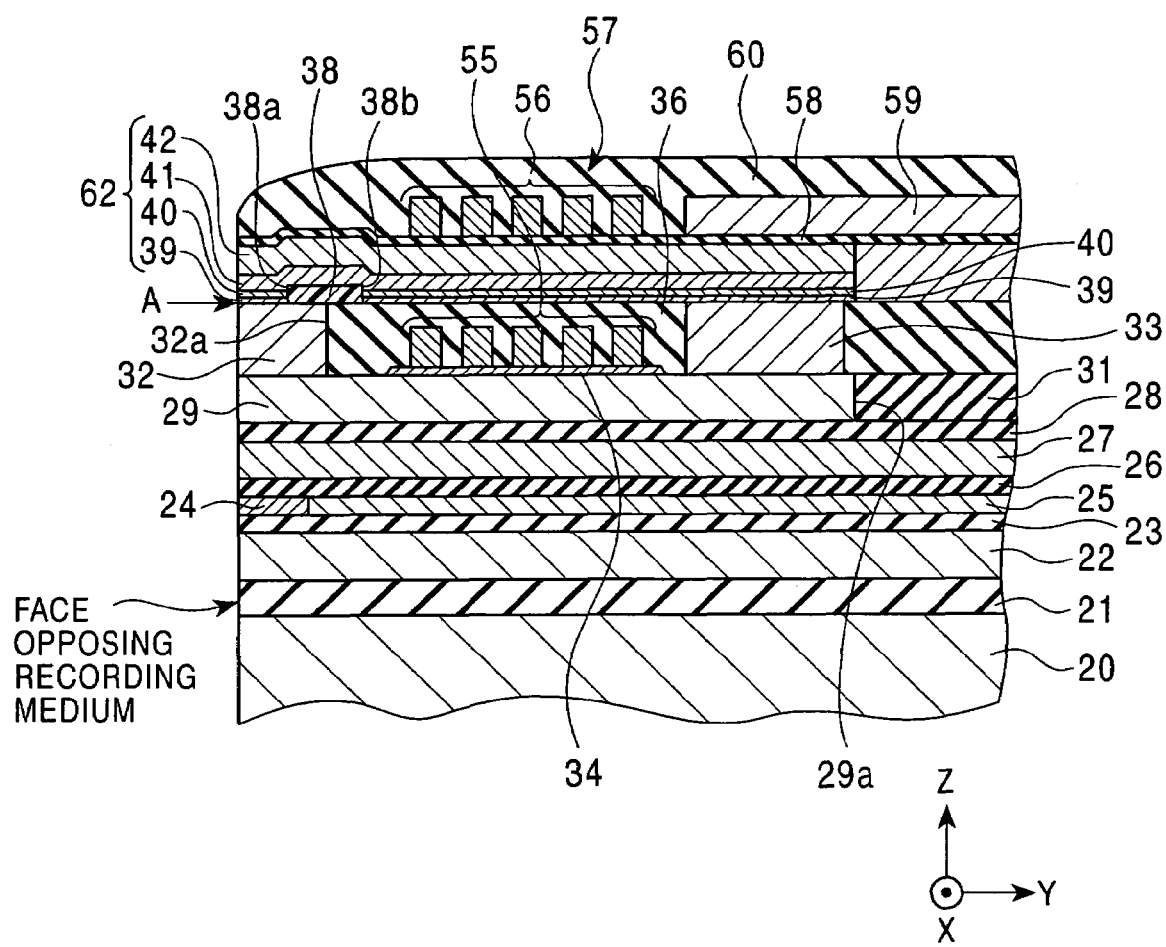
FIG. 1 is a vertical cross-sectional view of a thin-film magnetic head according to a first embodiment of the present invention.
Figure 2:
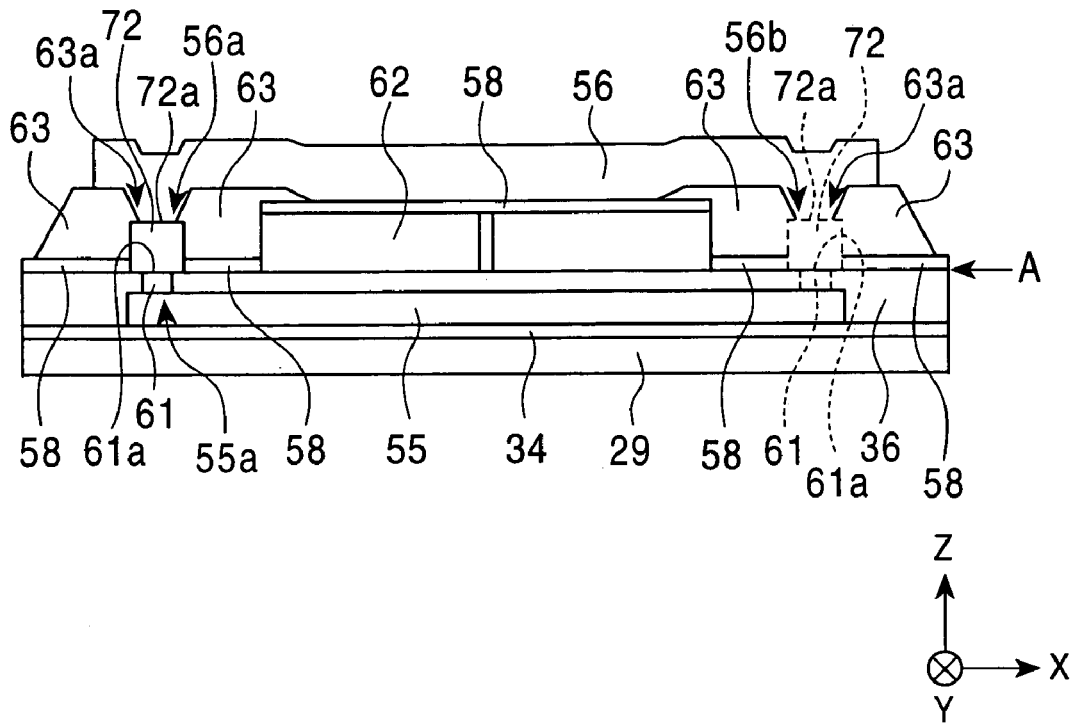
FIG. 2 is a partial front view of the thin-film magnetic head shown in FIG. 1.
Figure 3:
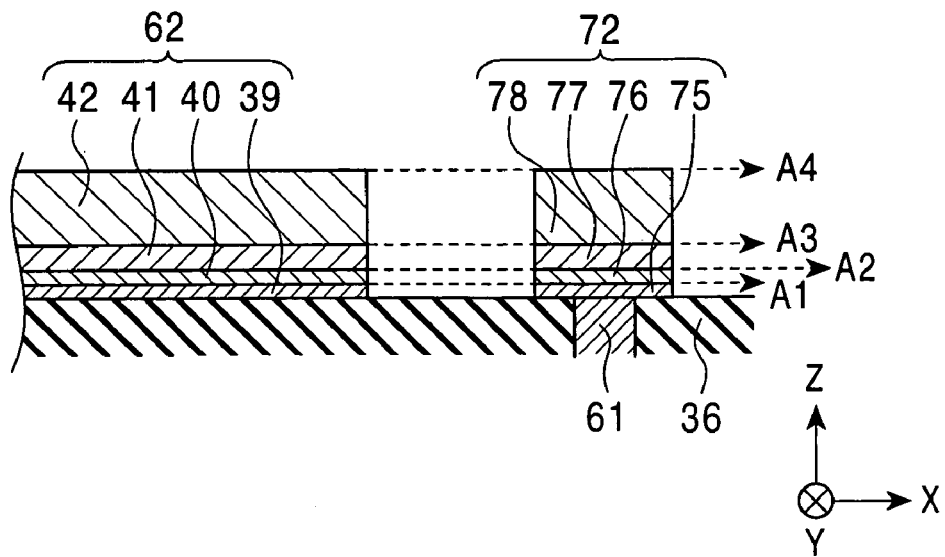
FIG. 3 is a partial enlarged cross-sectional view of a part of a magnetic pole layer and a bank layer shown in FIG. 2 taken in a direction parallel to the opposing face.
Figure 4:
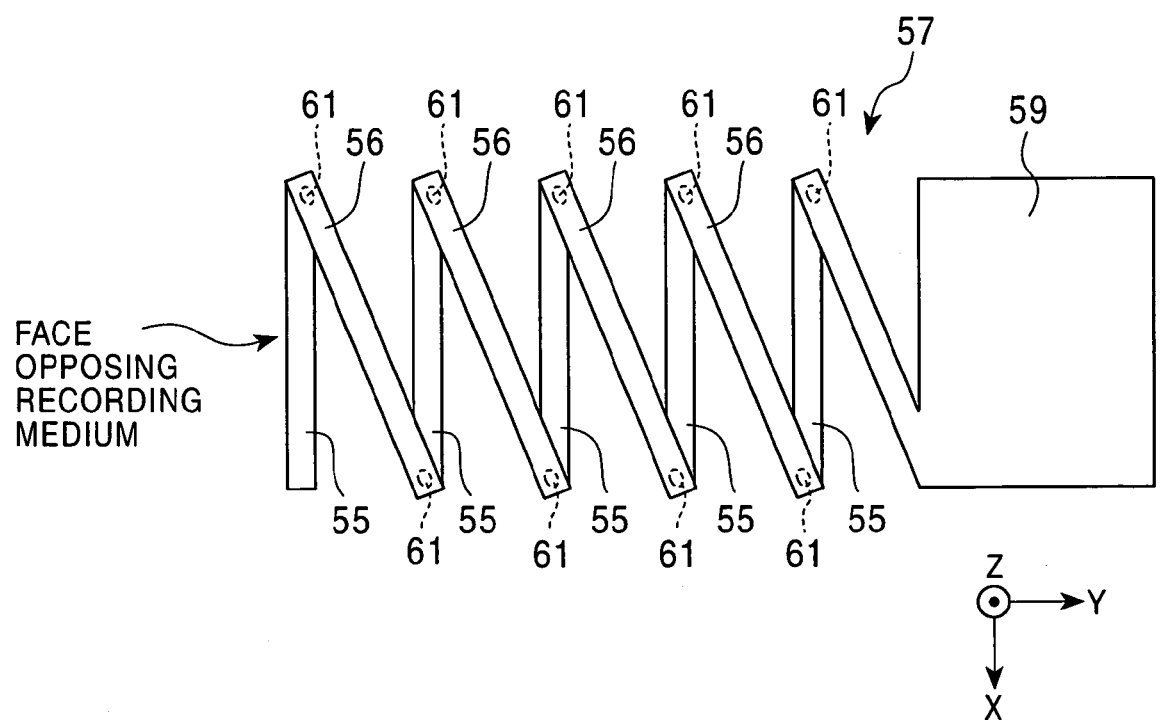
FIG. 4 is a partial plan view showing the shape of a coil of the thin-film magnetic head shown in FIG. 1.
Figure 5:
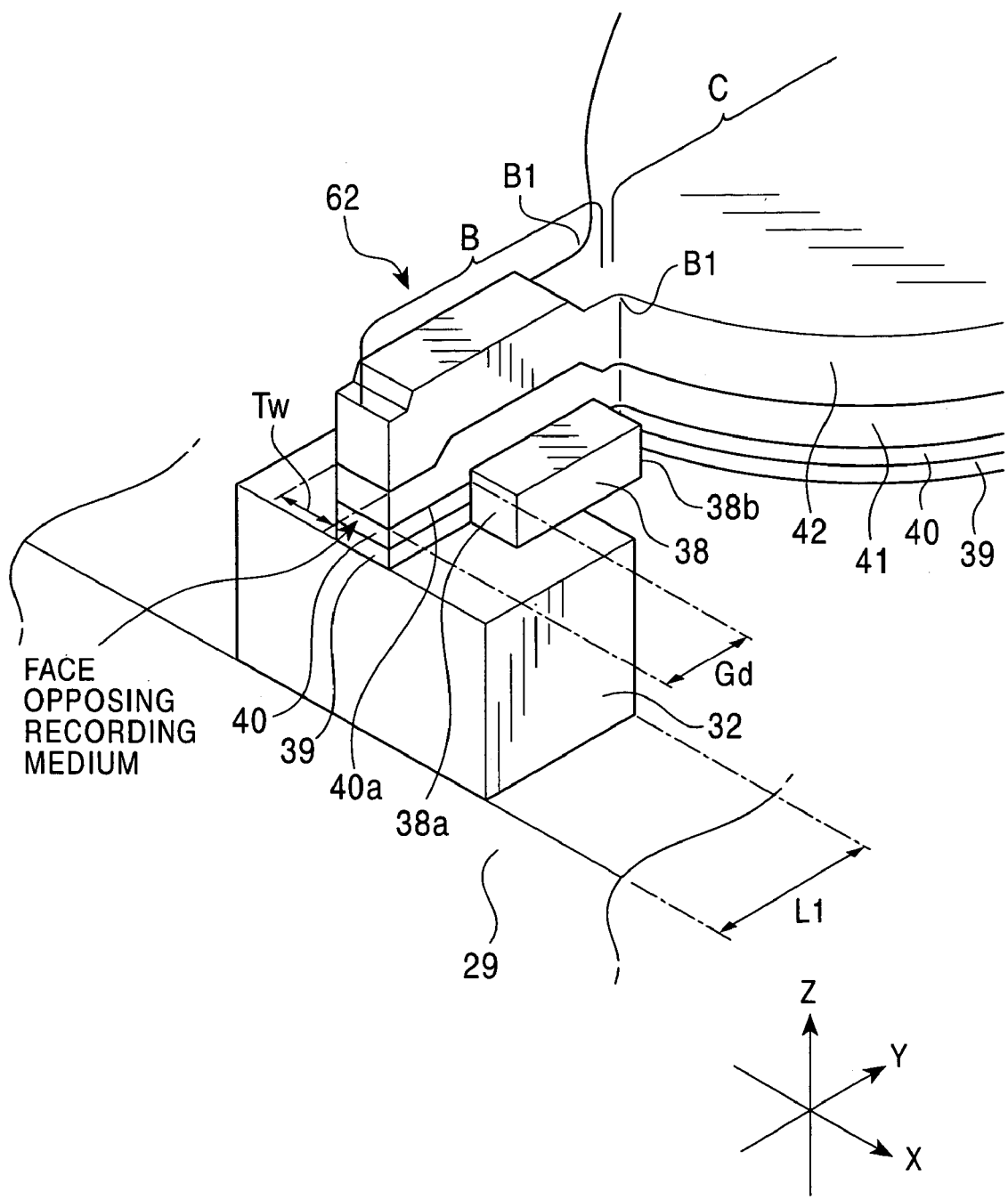
FIG. 5 is a partial enlarged perspective view of the thin-film magnetic head shown in FIG. 1.

FIG. 1 is a partial vertical cross-section of a thin-film magnetic head according to a first embodiment of the present invention. FIG. 2 is a partial front view of the thin-film magnetic head of FIG. 1 viewed from a face opposing a recording medium (hereinafter, the "opposing face"). In FIG. 2, a magnetoresistive (MR) head, a planarizing layer 32, a protective layer 60, and the like are omitted from the drawing so as to illustrate a first coil segment and a second coil segment that are located closest to the opposing face and the arrangement of other layers near these coil segments. FIG. 3 is an enlarged partial cross-section of a composite 62 and a bank layer 72 shown in FIG. 2 viewed from the opposing face. FIG. 4 is a partial plan view of a coil structure of the thin-film magnetic head shown in FIG. 1. FIG. 5 is a partial enlarged perspective view showing a part of the thin-film magnetic head shown in FIG. 1.

Hereinafter, the X direction in the drawing is also referred to as the "track width direction" and the Y direction is also referred to as the "height direction". The Z direction in the drawing is the direction in which a recording medium, e.g., a magnetic disk, travels. The front face of the thin-film magnetic head, i.e., the left-most face in FIG. 1, is referred to as the "face opposing a recording medium" or, simply, the "opposing face". For each of the layers described below, the "front face" is the face of the layer at the leftmost position in the drawing of FIG. 1, and the "rear face" is the face of the layer at the rightmost position in the drawing of FIG. 1.

Although the thin-film magnetic head described in the drawings is a composite thin-film magnetic head in which a recording head (also referred to as the "inductive head") and a reading head (also referred to as the "MR head") are combined, the scope of the present invention is not limited to this but includes thin-film magnetic heads including only recording heads.

Referring now to FIG. 1, a substrate 20 is composed of alumina titanium carbide ($Al_2O_3$—TiC), and an $Al_2O_3$ layer 21 is disposed on the substrate 20.

A lower shield layer 22 composed of a NiFe alloy or sendust is disposed on the $Al_2O_3$ layer 21. A lower gap layer 23 composed of $Al_2O_3$ or the like is disposed on the lower shield layer 22.

A magnetoresistive element 24 that has a predetermined length and extends from the opposing face in the height direction (the Y direction) is formed on the lower gap layer 23. An example of the magnetoresistive element 24 is a giant magnetoresistive (GMR) head such as a spin-valve thin-film element. An electrode layer 25 that has a large length in the height direction (the Y direction) is formed at two lateral sides of the magnetoresistive element 24.

An upper gap layer 26 composed of $Al_2O_3$ or the like is disposed on the magnetoresistive element 24 and the electrode layer 25. An upper shield layer 27 composed of a NiFe alloy or the like is disposed on the upper gap layer 26. The layers from the lower shield layer 22 to the upper shield layer 27 form a reading head, i.e., a MR head.

As shown in FIG. 1, a separating layer 28 composed of $Al_2O_3$ or the like is disposed on the upper shield layer 27. Alternatively, a lower core layer 29 described below may be formed instead of the upper shield layer 27 and the separating layer 28. In this case, the lower core layer 29 also functions as the upper shield layer.

In FIG. 1, the lower core layer 29 is formed on the separating layer 28. The lower core layer 29 is composed of a magnetic material such as a NiFe alloy. The lower core layer 29 extends from the opposing face in the height direction and has a predetermined length in the height direction. A nonmagnetic insulating material layer 31 is formed to extend in the height direction from a rear face 29a of the lower core layer 29. The nonmagnetic insulating material layer 31 is also provided at the two lateral sides of the lower core layer 29 in the track width direction (the X direction). As shown in FIG. 1, the upper face of the lower core layer 29 is flush with the upper face of the nonmagnetic insulating material layer 31.

A planarizing layer 32 that extends in the height direction from the opposing face is formed on the lower core layer 29. The planarizing layer 32 has a length L1 in the height direction (the Y direction), as shown in FIG. 5. A back gap layer 33 that extends in the height direction (the Y direction) from a position a predetermined distance away from a rear face 32a of the planarizing layer 32 is formed on the lower core layer 29.

The planarizing layer 32 and the back gap layer 33 are composed of a magnetic material. The planarizing layer 32 and the back gap layer 33 may or may not be composed of the same material as that of the lower core layer 29. The planarizing layer 32 and the back gap layer 33 may each be a single layer or a stack of a plurality of sublayers. The planarizing layer 32 and the back gap layer 33 are magnetically coupled to the lower core layer 29.

As shown in FIG. 1, an insulating underlayer 34 is formed on the lower core layer 29. The insulating underlayer 34 is located between the planarizing layer 32 and the back gap layer 33. As shown in FIG. 5, a plurality of first coil segments 55 parallel to each other and extending in the track width direction (the X direction) are formed on the insulating underlayer 34. The first coil segments 55 align along the height direction (the Y direction). Alternatively, the first coil segments 55 may be tilted toward the height direction with respect to the track width direction (the X direction).

The first coil segments 55 are embedded in a coil insulating layer 36 composed of an inorganic insulating material such as $Al_2O_3$. As shown in FIG. 1, the upper surface of the planarizing layer 32, the upper surface of the coil insulating layer 36, and the upper surface of the back gap layer 33 are flush with each other and form a continuous flat face that extends along a reference plane A.

Referring now to FIGS. 2 and 4, a conductive connecting layer 61 is formed to protrude from the upper face of an end portion 55a of each first coil segment 55. The planar shape of the connecting layer 61, i.e., the shape of the cross-section taken along the X-Y plane, may be oval, as shown in FIG. 4, circular, square, rectangular, rhombic, or the like. The connecting layer 61 is preferably but not necessarily composed of the same material as that of the planarizing layer 32 and the back gap layer 33. The connecting layer 61 may have a single-layer or multilayer structure. The connecting layer 61 is electrically connected to the end portion 55a of each first coil segment 55. For the purpose of this specification, the phrase "electrically connected" means that electric current flows between two components, layers, and the like regardless of whether they are directly connected or indirectly connected.

As is apparent from FIG. 4, the first coil segment 55 located closest to the opposing face, i.e., the leftmost first coil segment 55 in FIG. 4, carries only one connecting layer 61 at its end portion. Every other first coil segment 55 has two end portions that carry two connecting layers 61, respectively.

As shown in FIG. 2, an upper face 61a of each connecting layer 61 formed on the end portion 55a of the first coil segment 55 is flush with the reference plane A. In other words, in the thin-film magnetic head shown in FIG. 1, the upper face of the planarizing layer 32, the upper face of the coil insulating layer 36, the upper face of the back gap layer 33, and the upper face 61a of each connecting layer 61 are flush with each other, thereby forming a flat face.

Referring again to FIG. 1, a gap-depth (Gd) defining layer 38 is disposed on the upper surfaces of the planarizing layer 32 and the coil insulating layer 36 flush with each other. The Gd defining layer 38 extends in the height direction from a position a predetermined distance away from the opposing face.

In the embodiment shown in FIG. 1, a front face 38a of the Gd defining layer 38 is located on the planarizing layer 32 and a rear face 38b of the Gd defining layer 38 is located on the coil insulating layer 36.

As shown in FIG. 1, a lower magnetic pole layer 39 is formed on the planarizing layer 32 and at a region between the opposing face and the front face 38a of the Gd defining layer 38. The lower magnetic pole layer 39 is also formed on the coil insulating layer 36 and the back gap layer 33, i.e., at a region that extends in the height direction from the rear face 38b of the Gd defining layer 38. A gap layer 40 is disposed on the lower magnetic pole layer 39. The lower magnetic pole layer 39 and the gap layer 40 are formed by plating.

Referring again to FIG. 1, an upper magnetic pole layer 41 is formed on the gap layer 40 and the Gd defining layer 38 by plating. An upper core layer 42 is formed on the upper magnetic pole layer 41 by plating. The upper magnetic pole layer 41 is directly or indirectly connected with the lower core layer 29 via the back gap layer 33.

In this embodiment, the lower magnetic pole layer 39, the gap layer 40, the upper magnetic pole layer 41, i.e., the magnetic layer in the present invention, and the upper core layer 42 form a composite 62.

As shown in FIG. 2, a bank layer 72 is formed on the coil insulating layer 36 and at each side of the composite 62 in the track width direction (the X direction). The bank layer 72 is conductive and overlies the connecting layer 61. The bank layer 72 is electrically connected to the upper face of the connecting layer 61.

As shown in FIGS. 1 and 2, an insulating layer 58 is formed on the upper core layer 42. The insulating layer 58 is composed of an insulating material such as $Al_2O_3$. The insulating layer 58 is preferably composed of an inorganic insulating material. The insulating layer 58 extends over the coil insulating layer 36 disposed on the both sides of the composite 62 in the track width direction (the X direction). As shown in FIG. 2, an insulating layer 63 composed of an organic insulating material such as resist is formed over side end portions of the insulating layer 58 so as to cover the sides of the composite 62 in the track width direction (the X direction). The insulating layer 63 is also disposed near the bank layers 72.

The insulating layer 58 composed of an inorganic insulating material is formed by sputtering or the like. The thickness of the insulating layer 58 can be made smaller than that of the insulating layer 63 composed of an organic insulating material. Accordingly, the distance between the composite 62 and second coil segments 56 described below is reduced, and the magnetic efficiency can be improved. Furthermore, the insulation between the composite 62 and the second coil segments 56 can be secured.

As shown in FIGS. 1, 2, and 4, the second coil segments 56 are disposed on the insulating layer 58 and the insulating layer 63. The second coil segments 56 are parallel to each other and shifted toward the height direction (the Y direction) with respect to the track width direction (the X direction). Alternatively, the second coil segments 56 may extend in the track width direction (the X direction).

As shown in FIG. 4, the first coil segments 55 are not parallel to the second coil segments 56.

Referring now to FIG. 2, the insulating layer 63 covers edge portions of upper faces 72a of the bank layers 72 but does not cover the central portion of the upper face 72a of the bank layer 72. In particular, the insulating layer 63 has holes 63a at positions corresponding to the central portions of the upper faces 72a of the bank layers 72. The holes 63a are formed during the step of making the insulating layer 63 using a resist. In particular, the holes 63a are formed by exposure and development after the resist is applied on the entire upper face 72a of each bank layer 72.

As shown in FIG. 2, each end portion 56a of the second coil segment 56 is formed to fill the hole 63a of the insulating layer 63 and comes into contact with the upper face 72a of the bank layer 72. Thus, the end portions 56a of the second coil segments 56 are electrically connected to the bank layer 72.

Note that the connecting layer 61 and the bank layer 72 indicated by broken lines at the right side of the drawing of FIG. 2 electrically connect the right end portion of the first coil segment 55 behind (the Y direction) the first coil segment 55 illustrated in the drawing to a right end portion 56b of the second coil segment 56 illustrated in the drawing.

In the thin-film magnetic head shown in FIG. 1, the first coil segments 55 and the second coil segments 56 disposed under and above the composite 62, respectively, in the thickness direction are electrically connected to each other via connecting layers 61 and the bank layers 72 at the ends, thereby forming a coil structure 57.

Referring now to FIG. 1, the thin-film magnetic head also has a protective layer 60 composed of $Al_2O_3$ or the like and an extraction layer 59. The extraction layer 59 is integral with the second coil segment 56 located farthest from the opposing face in the height direction.

The characteristic features of the thin-film magnetic head shown in FIG. 1 will now be described.

In the thin-film magnetic head shown in FIG. 1, a plurality of first coil segments 55 are formed in the space defined by the lower core layer 29, the planarizing layer 32, and the back gap layer 33. Since the planarizing layer 32 and the back gap layer 33 protrude from the upper surface of the lower core layer 29, an adequate three dimensional space for accommodating the first coil segments 55 is prepared. In particular, when the planarizing layer 32 and the back gap layer 33 are formed by plating, the thickness of the planarizing layer 32 and the back gap layer 33 can be made larger. Thus, the space defined by the lower core layer 29, the planarizing layer 32, and the back gap layer 33 can be expanded, and the first coil segments 55 can be readily formed to have a predetermined thickness.

As shown in FIG. 2, the bank layers 72 for forming electrical connection with the end portions 55a are disposed at the two sides of the composite 62 in the track width direction (the X direction) on the coil insulating layer 36. The second coil segments 56 are formed on the composite 62 with the insulating layers 58 and 63 therebetween. The end portions 56a of the second coil segments 56 are electrically connected to the upper faces 72a of the bank layers 72. The coil structure 57 constituted from the first coil segments 55, the connecting layers 61, the bank layers 72, and the second coil segments 56 is formed as a result.

According to this structure, as shown in FIG. 2, the end portions 56a of the second coil segments 56 are uplifted by the bank layers 72. Compared to the conventional art, the end portions 56a of the second coil segments 56 are prevented from bending downward. In other words, since the resist for forming the second coil segments 56 by patterning is applied on a flat face, the resist can be patterned with high accuracy by exposure and development. The problem of failure of removing the resist layer at positions corresponding to the end portions 56a of the second coil segments 56 can be avoided. Moreover, the end portions 56a of the second coil segments 56 can be electrically connected to the upper faces 72a with ease at high reliability.

Furthermore, since the end portions 56a of the second coil segments 56 are uplifted by the bank layers 72, the end portions 56a of the second coil segments 56 can be securely insulated from the composite 62.

The bank layers 72 must be composed of a conductive material. An example layer structure of the bank layer 72 is as follows: in order from the bottom, a first sublayer composed of the same material as the lower magnetic pole layer 39 in the composite 62; a second sublayer composed of the same material as the gap layer 40; a third sublayer composed of the same material as the upper magnetic pole layer 41; and a fourth sublayer composed of the same material as the upper core layer 42. This structure will be described in detail below with reference to FIG. 3.

As shown in FIG. 3, the composite 62 is constituted from, in order from the bottom, the lower magnetic pole layer 39, the gap layer 40, the upper magnetic pole layer 41, and the upper core layer 42. Similarly, the bank layer 72 is constituted from, in order from the bottom, a first sublayer 75 composed of the same material as the lower magnetic pole layer 39, a second sublayer 76 composed of the same material as the gap layer 40, a third sublayer 77 composed of the same material as the upper magnetic pole layer 41, and a fourth sublayer 78 composed of the same material as the upper core layer 42.

As shown in FIG. 3, the composite 62 is formed on the flat upper face of the coil insulating layer 36. The flat upper face is parallel to the X-Y plane. The bank layer 72 is formed on the upper faces of the connecting layer 61 and the coil insulating layer 36, the upper faces being flush with each other. The height (A1) of the lower magnetic pole layer 39 is the same as the height of the first sublayer 75. The height (A2) of the gap layer 40 is the same as the height of the second sublayer 76. The height (A3) of the upper magnetic pole layer 41 is the same as that of the third sublayer 77. The height (A4) of the upper core layer 42 is the same as that of the fourth sublayer 78. The composite 62 and the bank layer 72 thus have the same height.

The bank layer 72 is formed at the same time with the composite 62. In particular, a resist is applied on the coil insulating layer 36 and the connecting layer 61 to form a resist layer, and the resist layer is exposed and developed to form patterns of the composite 62 and the bank layer 72. Subsequently, the material of the lower magnetic pole layer 39, the material of the gap layer 40, the material of the upper magnetic pole layer 41, and the material of the upper core layer 42 are sequentially deposited on each of the patterns by plating.

Forming the bank layer 72 is easy since the bank layer 72 is formed at the same time with the composite 62. The bank layer 72 and the composite 62 are simultaneously formed particularly because the gap layer 40 is formed by plating with a nonmagnetic metal material. In this manner, the second sublayer 76, which is composed of the same material as that of the gap layer 40, exhibits conductive properties and can function as an intermediate layer for electrically connecting the first coil segment 55 to the second coil segment 56.

The gap layer 40 and the second sublayer 76 are preferably composed of at least one of NiP, NiReP, NiPd, NiW, NiMo, NiRh, Au, Pt, Rh, Pd, Ru, and Cr. The gap layer 40 may have a single layer structure or multilayer structure. The gap layer 40 is more preferably composed of a NiP alloy. NiP alloys are suitable for use in continuous plating, have superior heat resistance, and strongly adhere to the materials that form the lower magnetic pole layer 39 and the upper magnetic pole layer 41.

In FIG. 3, each of the composite 62 and the bank layer 72 has a plated four-layer structure. Alternatively, the composite 62 may have a three-layer structure including the lower magnetic pole layer 39, the gap layer 40, and the upper magnetic pole layer 41; and the bank layer 72 may have a three-layer structure including the first sublayer 75, the second sublayer 76, and the third sublayer 77.

However, as shown in FIG. 3, the upper core layer 42 and the fourth sublayer 78 are preferably provided on the upper magnetic pole layer 41 and the third sublayer 77, respectively, for the following reasons.

The upper magnetic pole layer 41 and the lower magnetic pole layer 39 are formed by plating a magnetic material having a high saturation magnetic flux density in order to allow the recording magnetic field to concentrate near the gap and to improve the recording density. However, the growth of the layers having a high saturation magnetic flux density by plating is excessively slow, and growth of thick layers is generally difficult. On the other hand, the saturation magnetic flux density of the upper core layer 42 need not be as high as that of the upper magnetic pole layer 41 and the lower magnetic pole layer 39; therefore, plating conditions are not stringent, and the thickness can be easily increased. Accordingly, the recording characteristics can be improved by providing the upper core layer 42. In this embodiment, the thickness of the upper core layer 42 is larger than that of the upper magnetic pole layer 41.

The bank layer 72 need not be formed as the composite including the first to fourth sublayers 75 to 78 composed of the same materials as those of the composite 62. To be more specific, the bank layer 72 may be formed in a step separate from the step of forming the composite 62. The bank layer 72 may be formed by using a material having a superior electrical conductivity.

The bank layer 72 preferably includes at least one main layer composed of Cu, FeNi, Ni, Au, FeCo, FeCoRh, or FeCoNi. These materials are platable and have superior electrical conductivity.

These materials are easily oxidized when exposed to air. Since the upper face 72a of the bank layer 72 may be exposed to air before forming the second coil segments 56, and the upper face 72a as well as components near the upper face 72a may be oxidized, at least one protective layer is preferably formed by plating on the layer composed of Cu or Fe or the layer containing Co. The protective layer is preferably composed of a material selected from Ni, CuNi, and NiP.

The shape of the composite 62 will now be described with reference to FIG. 5. FIG. 5 is a perspective view showing an example of the composite 62. As shown in FIG. 5, the composite 62 has a front portion B, which extends from the opposing face in the track width direction (the X direction), and a rear portion C, which extends from rear edges B1 of the front portion B in the height direction (the Y direction). The width of the front portion B in the track width direction (the X direction) at the opposing face is predetermined, and the front portion B extends in the height direction without changing the predetermined width. On the other hand, the width of the rear portion C gradually increases along the height direction (the Y direction). The width of the upper magnetic pole layer 41 at the opposing face in the track width direction (the X direction) defines the track width Tw. In this embodiment, the track width Tw is within the range of 0.1 to 0.3 μm.

Alternatively, the front portion B may gradually widen along the height direction. In this case, the rear portion C becomes also wider than that shown in the drawing.

As show in FIG. 5, the gap depth (Gd) is the distance between the opposing face and the front end of the Gd defining layer 38 in the height direction (the Y direction).

Second Embodiment

Figure 6:
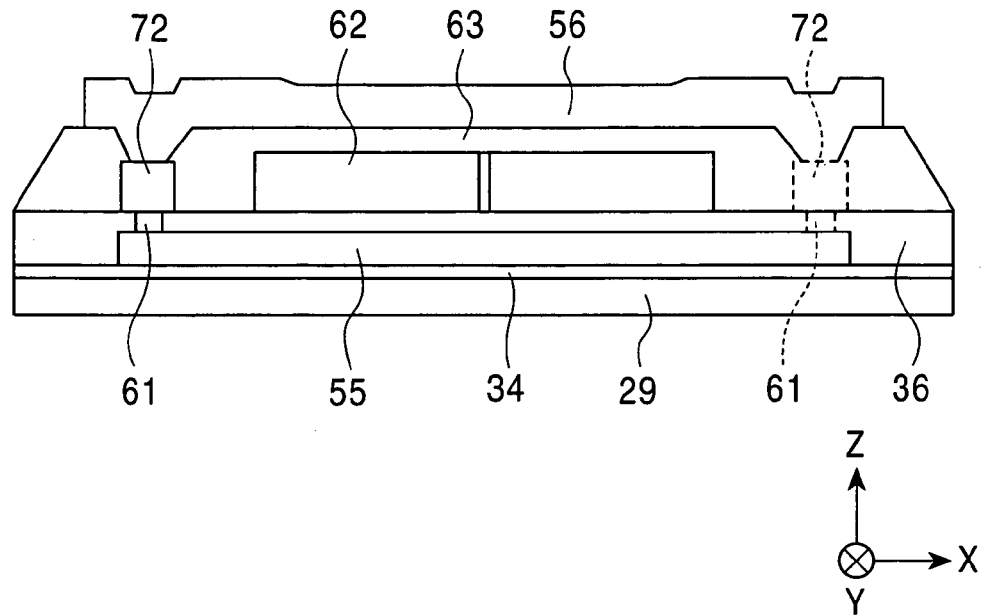
FIG. 6 is a partial front view of a thin-film magnetic head according to a second embodiment of the present invention.

FIG. 6 shows a second embodiment of the thin-film magnetic head. The structure shown in FIG. 6 is slightly different from that in FIG. 2. FIG. 6 is a partial front view showing the first coil segment and the second coil segment located closest to the opposing face, and the layers around the coil segments. The MR head, the planarizing layer 32, and the protective layer 60 are omitted from the drawing.

Unlike the thin-film magnetic head shown in FIG. 2, the thin-film magnetic head shown in FIG. 6 includes the insulating layer 63 composed of an organic insulating material such as resist are formed over the composite 62 so as to cover the upper face and the side faces of the composite 62. Unlike in FIG. 2, no insulating layer 58 composed of an inorganic insulating material is formed on the upper face of the composite 62. The structure shown in FIG. 6 is simple compared to that shown in FIG. 2 since only one type of insulating layer, i.e., the insulating layer 63, is formed over the composite 62 in order to insulate the composite 62 from the second coil segments 56. However, the thickness of the insulating layer 63 composed of the organic insulating material becomes larger than the insulating layer 58 formed by sputtering the inorganic insulating material. As a result, the distance between the upper face of the composite 62 and the lower face of the second coil segment 56 increases, thereby decreasing the magnetic efficiency, which is a problem.

Third Embodiment

Figure 7:
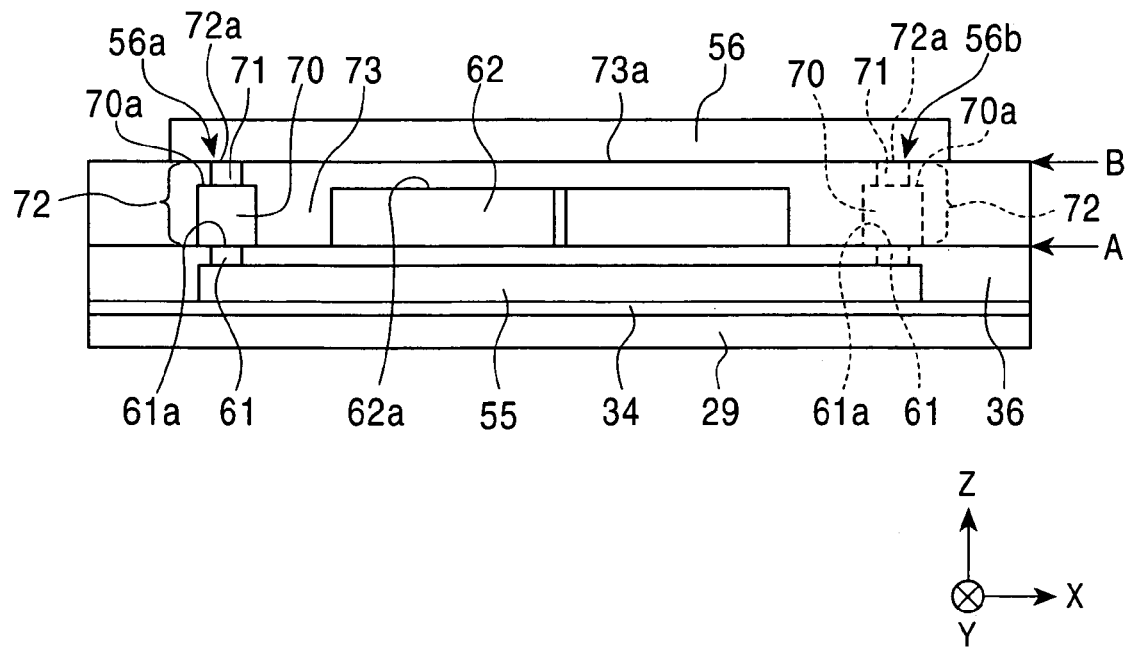
FIG. 7 is a partial front view of a thin-film magnetic head according to a third embodiment of the present invention.

FIG. 7 is a partial front view of a thin-film magnetic head according to a third embodiment of the present invention. FIG. 7 shows the first coil segment and the second coil segment located closest to the opposing face, and the layers around the coil segments. The MR head, the planarizing layer 32, and the protective layer 60 are omitted from the drawing.

In the thin-film magnetic head shown in FIG. 7, the structure of the layers below the reference plane A is the same as in FIG. 2. In particular, the first coil segments 55 are disposed in the space defined by the lower core layer 29, the planarizing layer 32, and the back gap layer 33, and the upper face 61a of the connecting layer 61 projecting from the upper surface of the end portion 55a, the upper face of the planarizing layer 32, the upper face of the coil insulating layer 36, and the upper face of the back gap layer 33 are flush with one another.

In FIG. 7, the composite 62 is accurately formed on the upper faces of the planarizing layer 32, the coil insulating layer 36, and the back gap layer 33 to have a predetermined shape. The bank layers 72 that electrically connect with the connecting layer 61 are formed at the two sides of the composite 62 in the track width direction (the X direction).

As shown in FIG. 7, each bank layer 72 is a combination of two bank sublayers stacked with step differences. A lower bank sublayer 70 of the bank layer 72 is a composite constituted from the first to fourth sublayers 75 to 78 formed of the same materials as those of the composite 62 by plating. Alternatively, the lower bank sublayer 70 may be a multilayer structure including at least one main layer composed of Cu, FeNi, Ni, Au, FeCo, FeCoRh, or FeCoNi, and at least one protective layer composed of Ni, CuNi, or NiP disposed on the main layer.

An upper bank sublayer 71 of the bank layer 72 adjusts the height of the bank layer 72 as a whole. As is apparent from FIG. 7, the upper face 72a of the bank layer 72 lies at a position higher than that of an upper face 62a of the composite 62 because the upper bank sublayer 71 is disposed on the lower bank sublayer 70.

The upper bank sublayer 71 is composed of a platable conductive material. The upper bank sublayer 71 preferably includes at least one main layer composed of Cu, FeNi, Ni, Au, FeCo, FeCoRh, or FeCoNi and at least one protective layer composed of Ni, CuNi, or NiP formed on the main layer.

The lower face of the lower bank sublayer 70 is electrically connected to the upper face of the connecting layer 61. An upper face 70a of the lower bank sublayer 70 is electrically connected to the lower face of the upper bank sublayer 71.

The advantage of making the bank layer 72 into a two-stage structure lies in that the height of the bank layer 72 can be easily made higher than the height of the composite 62. The upper bank sublayer 71 is formed on the lower bank sublayer 70 by plating in a step separate from the step of making the upper bank sublayer 71.

Since the height of the bank layer 72 is larger than that of the composite 62, an upper face 73a of an insulating layer 73 (preferably composed of an inorganic insulating material) covering the upper face and the side faces of the composite 62 can be formed as a flat face parallel to the X-Y plane in the drawing. Accordingly, the second coil segments 56 can be accurately formed on the flat face by patterning. As a result, the upper faces 72a of the bank layers 72 can be reliably and easily connected to the end portions 56a and 56b of the second coil segments 56. Moreover, the second coil segments 56 can be securely insulated from the composite 62 due to the presence of the taller bank layer 72.

Fourth Embodiment

Figure 8:
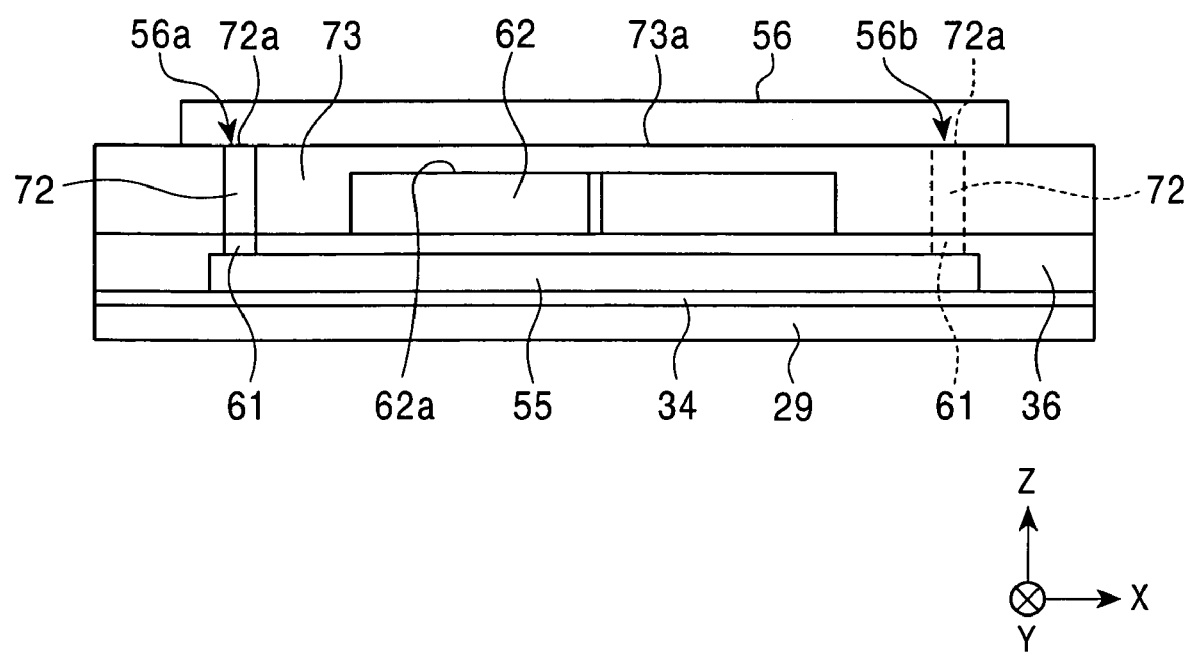
FIG. 8 is a partial front view of a thin-film magnetic head according to a fourth embodiment of the present invention.

FIG. 8 shows a thin-film magnetic head according to a fourth embodiment of the present invention. In the fourth embodiment also, the upper face 72a of the bank layer 72 lies at a position higher than that of the upper face 62a of the composite 62.

As shown in FIG. 8, each bank layer 72 is formed on the coil insulating layer 36 at the side of the composite 62 in the track width direction (the X direction). Cross-sectional areas across the entire length of the bank layer 72 taken parallel to the X-Y plane in the drawing are uniform. The bank layer 72 may have a single layer structure or multilayer structure formed of one or more conductive material. As shown in FIG. 8, the upper face 72a of the bank layer 72 lies at a higher position than the upper face 62a of the composite 62. The bank layer 72 of FIG. 8 is preferably constituted from at least one layer formed of Cu, FeNi, Ni, Au, FeCo, FeCoRh, or FeCoNi by plating. More preferably, the bank layer 72 is a composite structure constituted from at least one main layer formed of Cu. FeNi, Ni, Au, FeCo, FeCoRh, or FeCoNi by plating and at least one protective layer composed of Ni, CuNi, or NiP disposed on the main layer.

Accordingly, in the thin-film magnetic head shown in FIG. 8 also, the second coil segments 56 can be formed on the flat face. Thus, patterning for the second coil segments 56 can be carried out with high accuracy. As a result, the upper faces 72a of the bank layers 72 exposed at the flat face can be easily and reliably electrically connected to the end portions 56a and 56b of the second coil segments 56. Moreover, since the bank layer 72 is taller than the upper face 62a, the second coil segments 56 can be securely insulated from the composite 62.

Note that the bank layer 72 shown in FIG. 8 differs from that shown in FIG. 7 in manufacturing process.

In the embodiment shown in FIG. 7, the lower bank sublayer 70 of the bank layer 72 is formed at the same time with the composite 62 or in the step before or after the step of making the composite 62. Subsequently, the upper bank sublayer 71 is formed on the lower bank sublayer 70, so as to make the upper face 72a of the bank layer 72 lying at a position higher than that of the upper face 62a of the composite 62. Since the lower bank sublayer 70 and the upper bank sublayer 71 are formed in separate steps, step differences are formed between the lower bank sublayer 70 and the upper bank sublayer 71. After the upper bank sublayer 71 is formed, the insulating layer 73 is sputter-deposited over the composite 62 and the bank layer 72. The upper face of the insulating layer 73 is polished by CMP or the like so as to planarize the upper face 73a of the insulating layer 73 to be parallel to the X-Y plane of the drawing and so as to expose the upper faces 72a of the bank layers 72. A pattern for the second coil segments 56 is then formed on the insulating layer 73 and the bank layer 72.

On the other hand, in the embodiment shown in FIG. 8, the entire bank layer 72 is formed by plating before or after the step of forming the composite 62. Subsequently, the insulating layer 73 is formed, polishing by CMP or the like is performed, and the pattern for the second coil segments 56 is formed.

Note that the height of the bank layer 72 is preferably adjusted by forming the upper bank sublayer 71 with step differences, as shown in FIG. 7. In this manner, the position of the upper face 72a of the bank layer 72 can be made higher than that of the upper face 62a of the composite 62 without adversely affecting the function of the bank layer 72, i.e., the function as an intermediate layer for electrically conducting between the first coil segment 55 and the second coil segment 56. In order to make the bank layer 72 shown in FIG. 8, a thick resist layer must be formed before or after forming the composite 62, a hole that reaches the upper face of the connecting layer 61 must be formed in the resist layer by exposure and development, and the bank layer 72 must be formed in this hole by plating. During this process, the resist layer may not properly come off by the exposure and development, and the resist layer may remain in the position of the hole. As a result, the bank layer 72 does not electrically connect with the connecting layer 61 and does not function as the intermediate layer.

Fifth Embodiment

Figure 9:
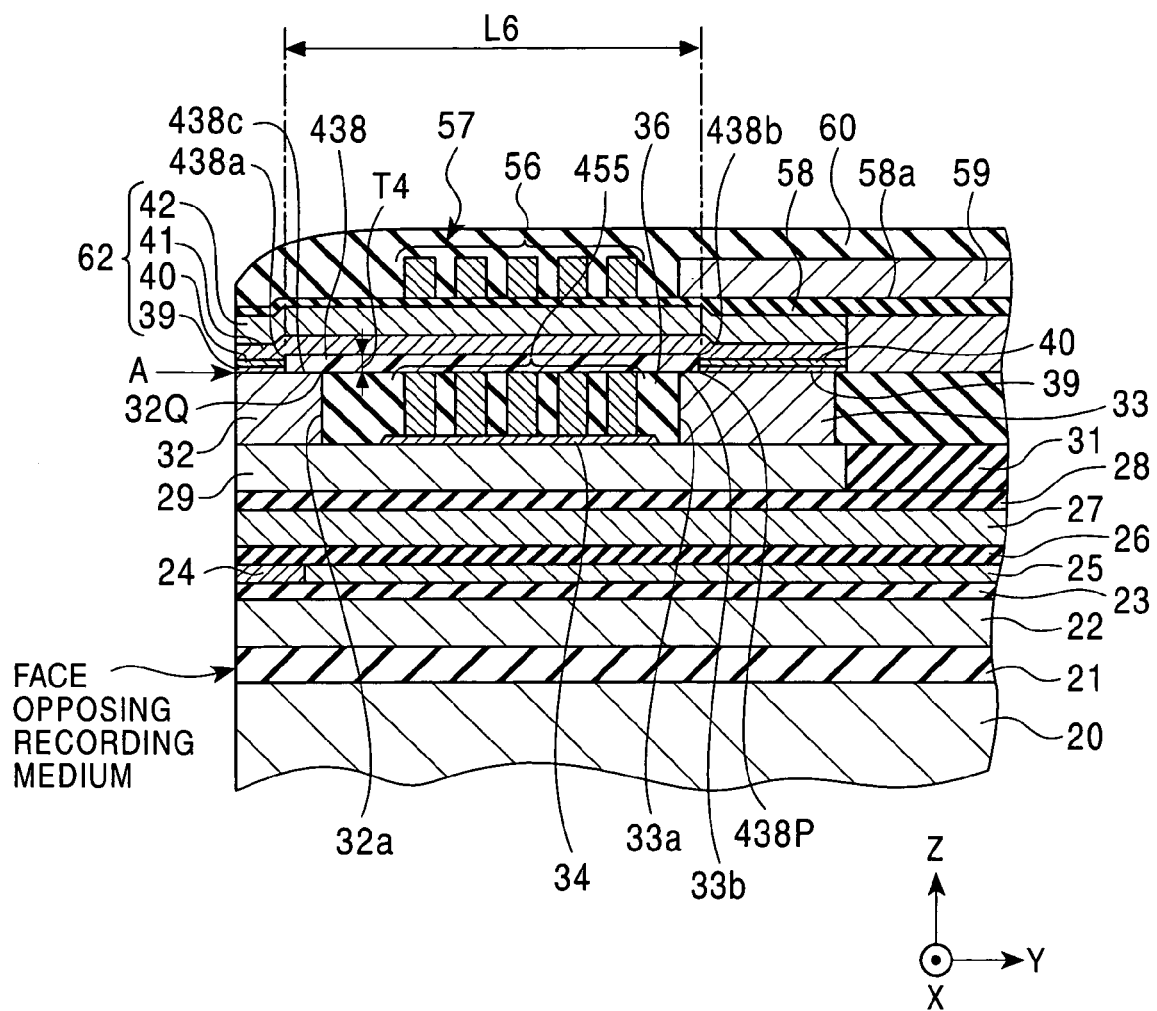
FIG. 9 is a vertical cross-sectional view of thin-film magnetic head according to a fifth embodiment of the present invention.

FIG. 9 is a partial vertical cross-sectional view of a thin-film magnetic head according to a fifth embodiment of the present invention. The structure of the thin-film magnetic head shown in FIG. 9 is similar to that shown in FIG. 1. The detailed explanation of the components of the structure will thus be omitted to avoid redundancy. The same components are referred to by the same reference numbers.

In the thin-film magnetic head shown in FIG. 9, upper faces of first coil segments 455 are flush with the reference plane A shown in FIG. 9. The upper face of the planarizing layer 32, the upper faces of the first coil segments 455, the upper face of the coil insulating layer 36, and the upper face of the back gap layer 33 form one continuous flat face flush with the reference plane A.

A Gd defining layer 438 is formed on the flat face. The Gd defining layer 438 extends from a position a predetermined distance away from the opposing face in the height direction (the Y direction). A front face 438a of the Gd defining layer 438 is disposed on the planarizing layer 32, as in FIG. 1. A rear face 438b of the Gd defining layer 438 is located on the back gap layer 33. Alternatively, the rear face 438b may be located at a border 33b where the upper face of the back gap layer 33 and the end 33a meet.

In the thin-film magnetic head shown in FIG. 9, the Gd defining layer 438 is formed above the first coil segments 455. The Gd defining layer 438 is composed of an organic or inorganic insulating material. Thus, the first coil segments 455 can be insulated from the composite 62 even though the upper faces of the first coil segment 455 are extended to the reference plane A so as to come into contact with a lower face 438c of the Gd defining layer 438. According to this structure, the area of the cross-sections of the first coil segments 455 can be increased, and the resistance can be decreased.

Figure 10:
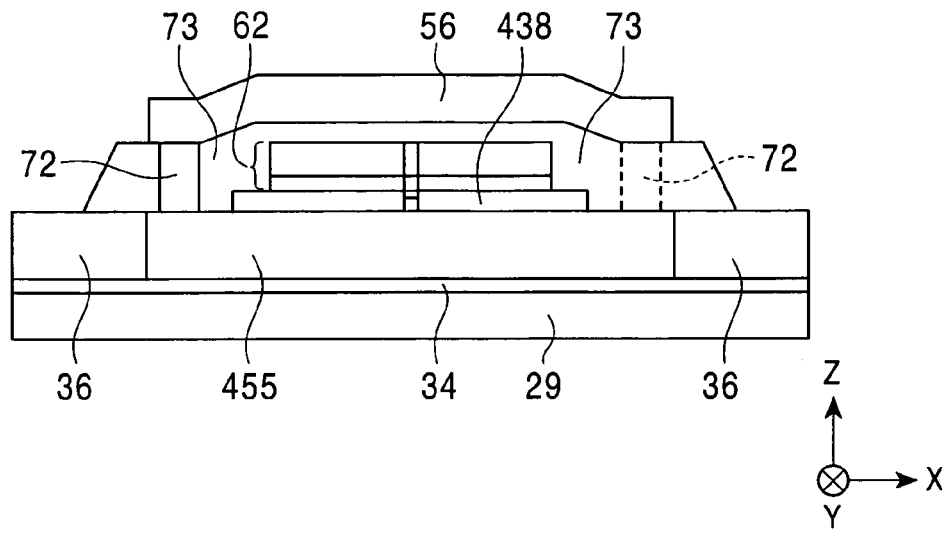
FIG. 10 is a partial front view of the thin-film magnetic head according to the fifth embodiment of the present invention.

FIG. 10 is a plan view of the thin-film magnetic head shown in FIG. 9 viewed from the opposing face. Note that in FIG. 10, the planarizing layer 32 is omitted from the drawing to show the first coil segment 455 behind the planarizing layer 32.

In this embodiment, the upper faces of the first coil segments 455 are flush with the upper faces of the planarizing layer 32, the coil insulating layer 36, and the back gap layer 33, thereby forming a flat face at the reference plane A. In this manner, the first coil segments 455 can be directly connected to the bank layers 72. Thus, the connecting layer 61 for connecting the first coil segments to the bank layers shown in FIGS. 1 to 8 is no longer necessary. Since the number of connector decreases, the resistance of the coil as a whole can be decreased. Accordingly, the heat output can be reduced, the thermal expansion or projection at the opposing face can be decreased, and a magnetic head with a low floating amount can be provided.

Although the shape of each bank layer 72 in FIG. 10 is identical to that shown in FIG. 8, the shape of the bank layer 72 may be such as that shown in FIGS. 2, 6, or 7.

The coil of the present invention is not limited to that shown in FIG. 3, i.e., the coil constituted from the first coil segments 55 parallel to each other and the second coil segments 56 parallel to each other.

To be more specific, the coil of the present invention may be of any arrangement as long as the first coil segments in the space defined by the lower core layer 29, the planarizing layer 32, and the back gap layer 33 extend across the composite 62 and the second coil segments are formed across the composite 62 so that the adjacent first coil segments can be connected to each other at the ends via the second coil segments, thereby making a toroidally wound coil.

FIGS. 11 to 15 show the first coil segments and the second coil segments of the present invention in plan views.

Figure 11:
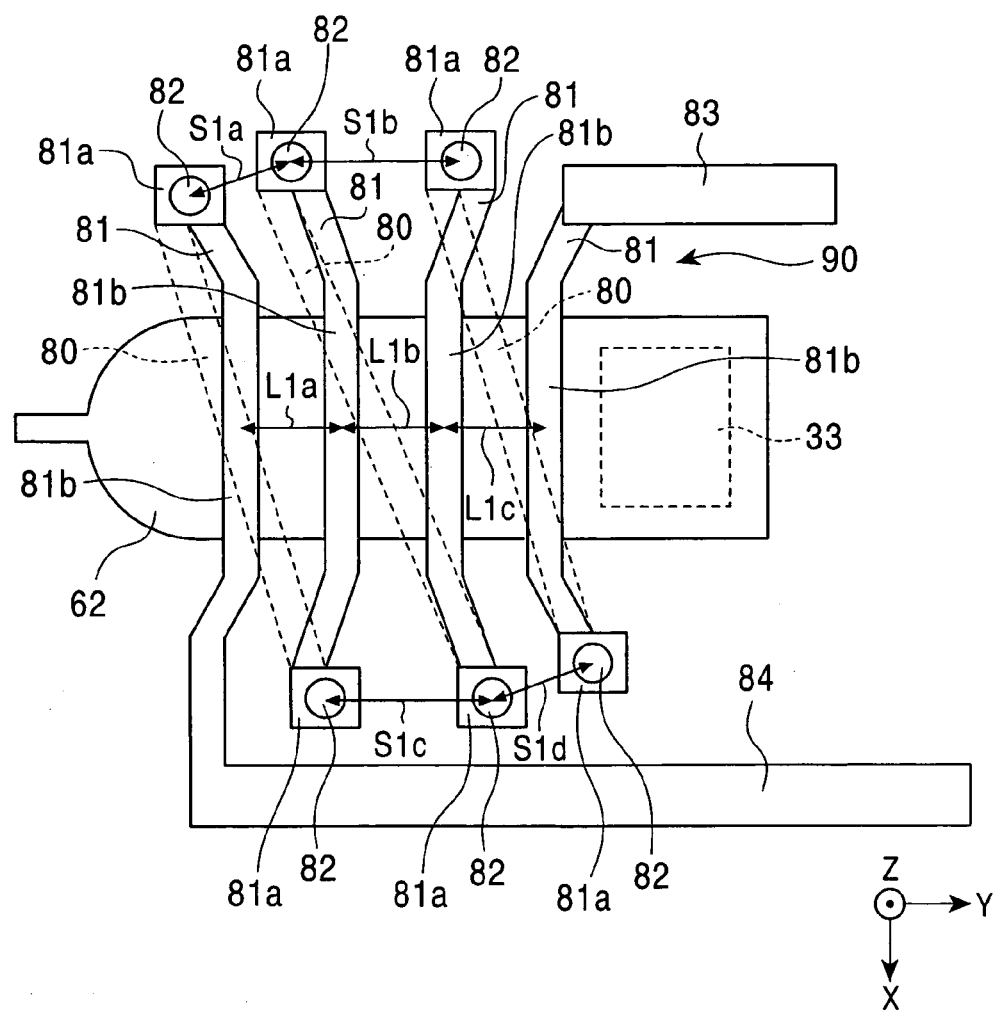
FIG. 11 is a partial plan view showing the shape of a coil of the thin-film magnetic head of the present invention.

FIG. 11 illustrates the composite 62 and a coil 90; other parts are omitted from the drawing. The thin-film magnetic head shown in FIG. 11 has nearly the same structure as that of the thin-film magnetic head shown in FIG. 1. The difference lies in the structure of the coil.

In particular, first coil segments 80, which constitute the coil 90 shown in FIG. 11, are not parallel to each other. Second coil segments 81 are parallel to each other only in portions 81b overlapping the composite 62. The distance between portions of the second coil segments 81 in the height direction (the Y direction) at the sides of the composite 62 gradually decreases toward end portions 81a.

Note that in FIG. 11, the first coil segments 80 formed under the composite 62 is illustrated by dotted lines, and the second coil segments 81 formed above the composite 62 are illustrated in solid lines.

As with the structures shown in FIGS. 2 and 4, the end portions 81a of the second coil segments 81 are connected to conductive bank layers 82. The bank layers 82 are connected to the ends of the first coil segments 80. The ends of the first coil segments 80 overlap the end portions 81a of the second coil segments 81 and thus not illustrated in the drawing of FIG. 11. The bank layers 82 has a structure identical to the bank layers 72 and are connected to the ends of the first coil segments 80 via connecting layers identical to the protective layer connecting layers 61. The coil 90 shown in FIG. 11 is also toroidally wound around the composite 62. Extraction layers 83 and 84 are also provided to connect ends of the coil 90 to the electrode layers.

In FIG. 11, for example, a distance S1a between an end portion 81a of the leftmost second coil segment 81 in the drawing and an end portion 81a of the next leftmost second coil segment 81 is larger than a minimum distance L1a in the region overlapping the composite 62.

Distances S1b and S1c between an end portion 81a of the next leftmost second coil segment 81 and an end portion 81a of the right adjacent second coil segment 81 are each larger than a minimum distance L1b in the region overlapping the composite 62. A distance S1d between an end portion 81a of the rightmost second coil segment 81 in the drawing and an end portion 81a of the left adjacent second coil segment 81 is larger than a minimum distance L1c in the region overlapping the composite 62.

Note that in the above description, the distance between the end portions 81a is defined as the distance between the center of the end portion 81a and the center of the other end portion 81a. The term "minimum distance" in the region overlapping the composite 62 is defined as the minimum distance between a line that bisects one second coil segment in the width direction and another line that bisects another second coil segment in the width direction.

The inductance of inductive thin-film magnetic heads is preferably reduced by minimizing the area of the magnetic circuit in which a magnetic flux flows. Accordingly, the length of the composite 62 in the height direction must be reduced, and the distances L1a, L1b, and L1c in the region overlapping the composite 62 must also be reduced. By increasing the distance between the end portions 81a of the adjacent second coil segments 81 as in the present invention, the end portions 81a can be easily formed, and the ends of the first coil segments 80 can be easily and reliably connected to the end portions 81a of the second coil segments 81.

Moreover, the second coil segments 81 have portions 81b parallel to each other in the region overlapping the 62. Since the portions 81b extend in the track-width direction in the drawing, the magnetic field induced from the coil 90 to the composite 62 can be stabilized.

Figure 12:
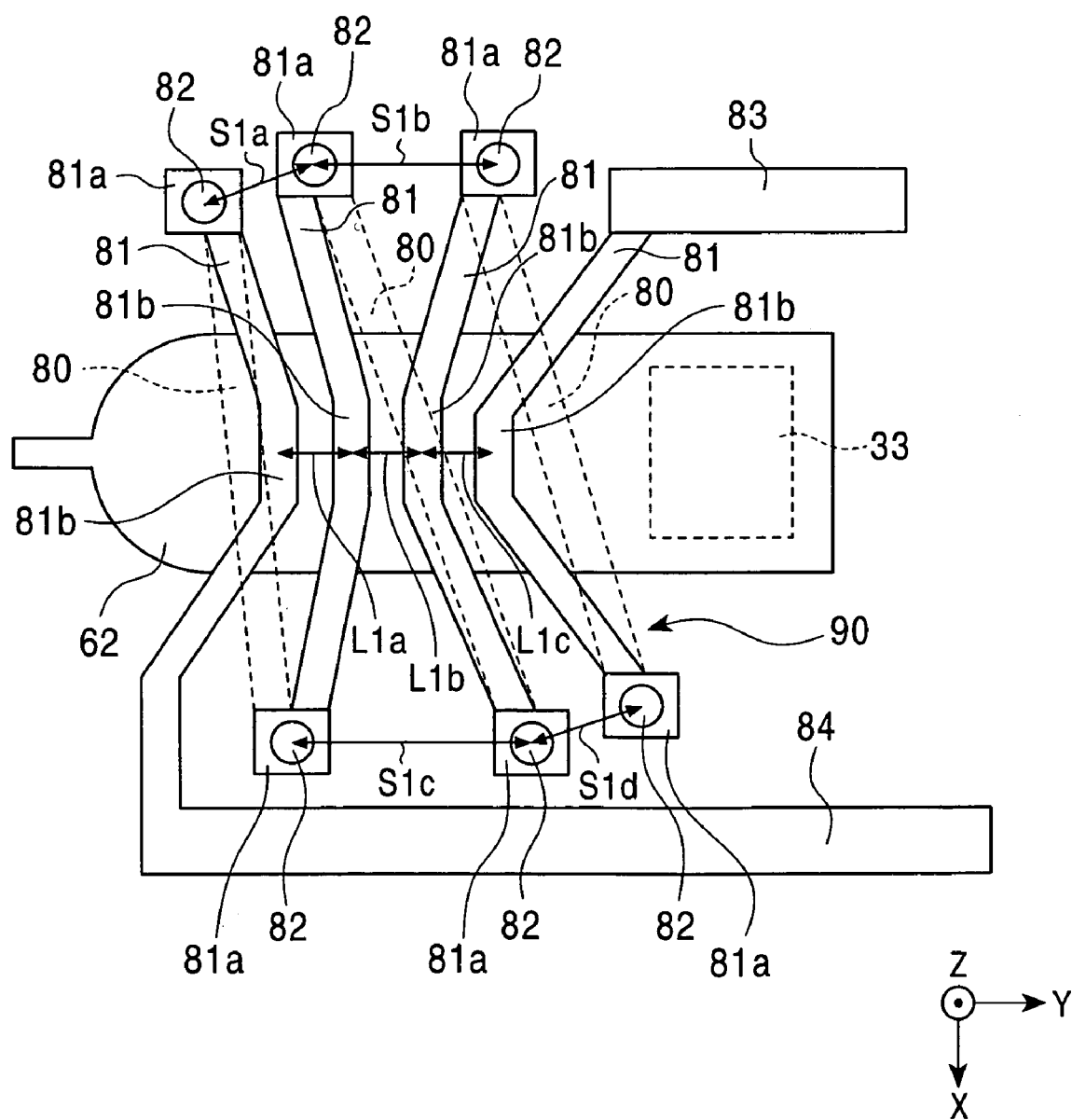
FIG. 12 is a partial plan view showing the shape of another coil of the thin-film magnetic head of the present invention.

According to the structure of the coil 90 shown in FIG. 11, the second coil segments 81 run parallel to each other in the entire region overlapping the composite 62. Alternatively, as shown in FIG. 12, the second coil segments 81 may have portions 81b parallel to each other only in a limited portion of the region overlapping the composite 62. This structure can also stabilize the magnetic field induced from the coil 90 to the composite 62.

In the present invention, at least one distance between the end portions 81a of the adjacent second coil segments 81 need be larger than the minimum distance between the second coil segments 81 in the region overlapping the composite 62.

Figure 13:
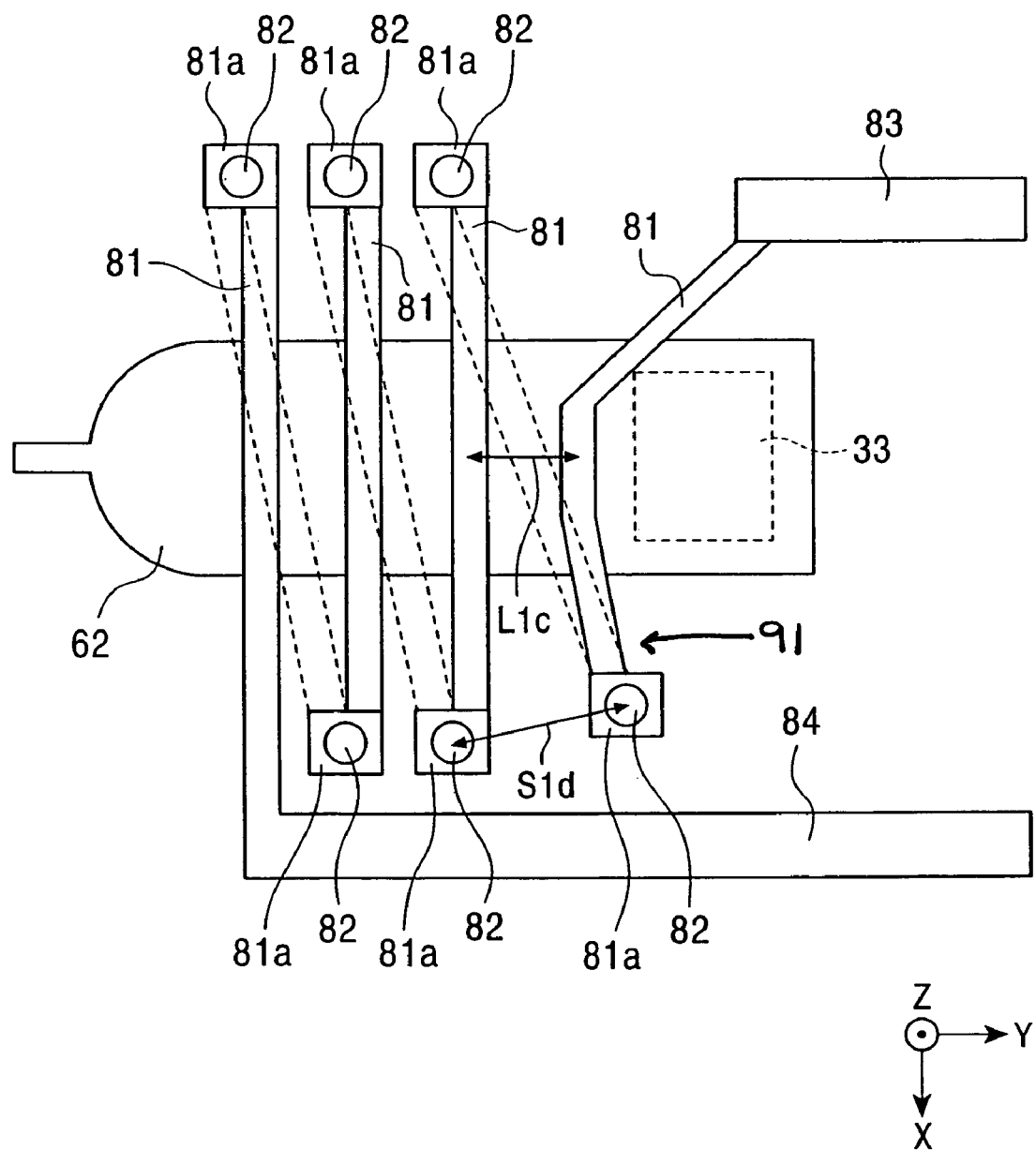
FIG. 13 is a partial plan view showing the shape of yet another coil of the thin-film magnetic head of the present invention.

For example, the coil structure shown in FIG. 13 is also included within the scope of the present invention. In FIG. 13, only the distance S1d between the end portions 81a of the rightmost second coil segment 81 and the left adjacent second coil segment 81 is larger than the minimum distance L1c between the second coil segments 81 in the region overlapping the composite 62. However the distance between the end portions 81a in other sets of adjacent second coil segments 81 is the same as the minimum distance in the region overlapping the composite 62.

The arrangements of the second coil segments 81 shown in FIGS. 11 to 13 may also be applied to the first coil segments 80.

Figure 14:
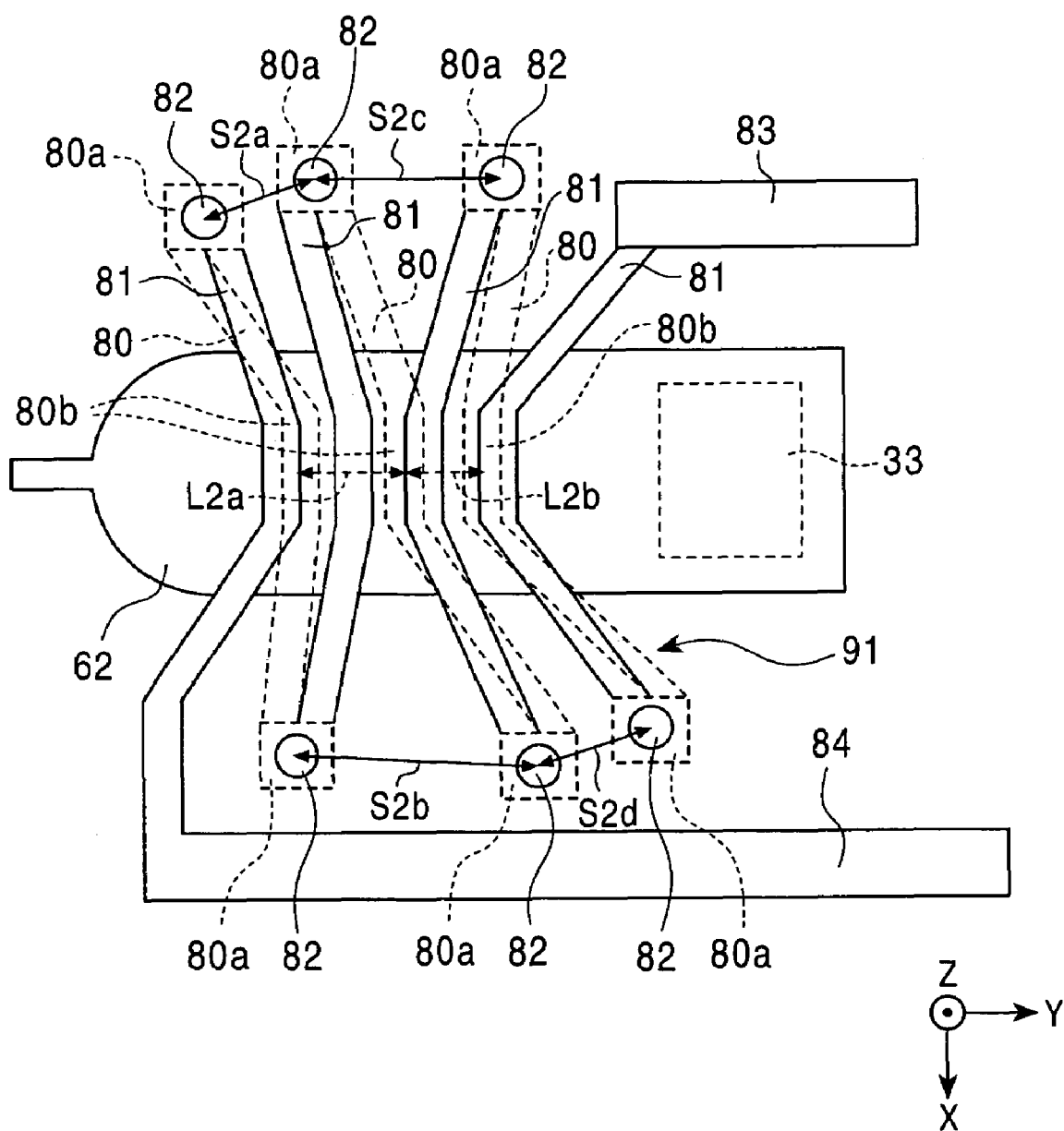
FIG. 14 is a partial plan view showing the shape of yet another coil of the thin-film magnetic head of the present invention.

FIG. 14 shows a coil 91 including the first coil segments 80, the distance between each other gradually widening towards ends of the first coil segments 80.

The arrangement of the second coil segments 81 of the coil 91 shown in FIG. 14 are the same as in those of FIG. 12. In FIG. 14, ends 80a of the first coil segments 80 are illustrated, and the end portions 81a of the second coil segments 81 are omitted from the drawing.

Figure 15:
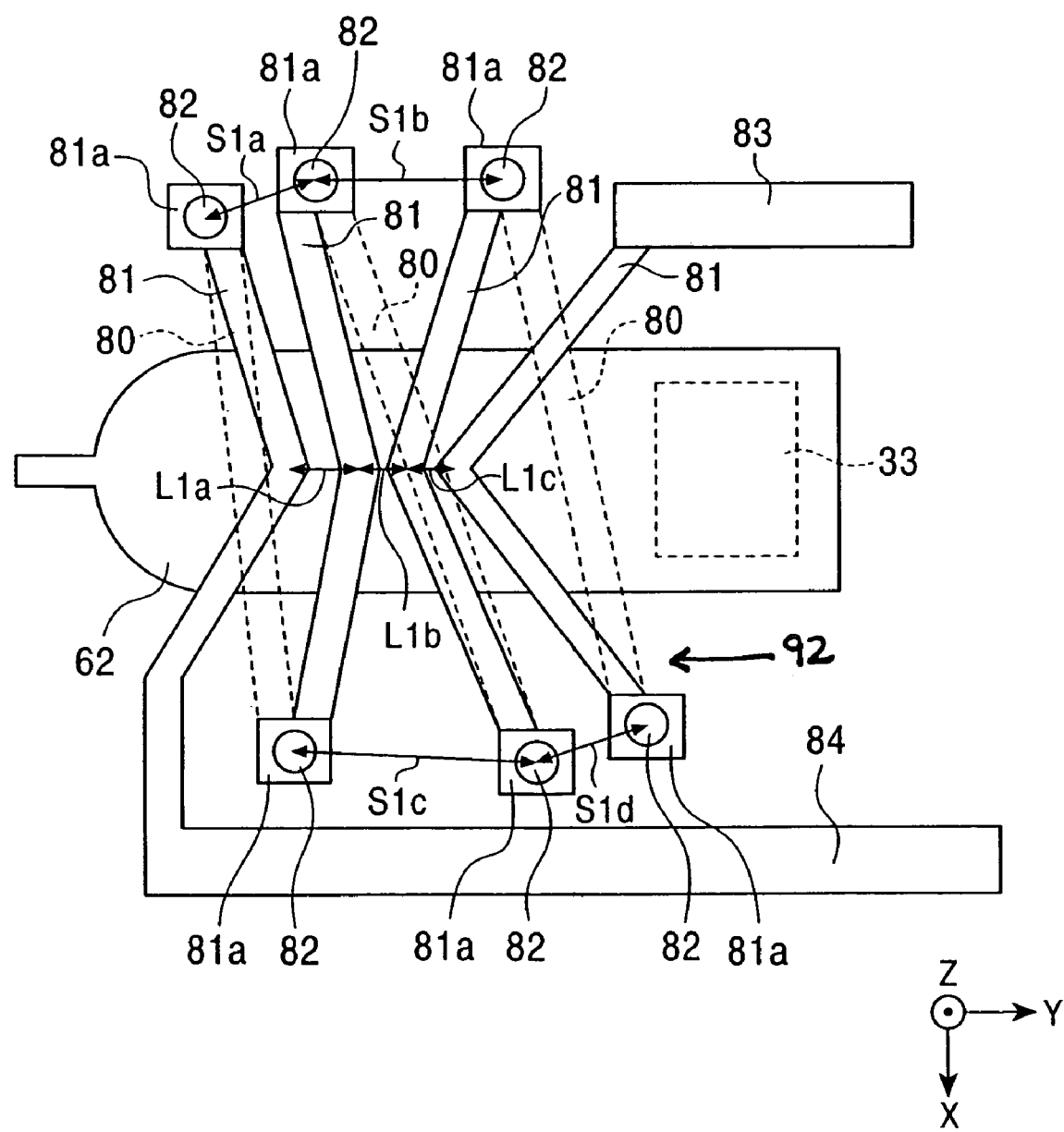
FIG. 15 is a partial plan view showing the shape of another coil of the thin-film magnetic head of the present invention.

In FIG. 15, distances S2a and S2b between the ends 80a of the leftmost first coil segment 80 and the right adjacent first coil segment 80 in the drawing are larger than a minimum distance L2a in the region overlapping the composite 62.

The distance S1c and S1d between the ends 80a of the next leftmost first coil segment 80 and the right adjacent first coil segment 80 in the drawing are larger than a minimum distance L2b in the region overlapping the composite 62.

Note that in the description above, the distance between the ends 80a is given in terms of the distance between the centers of the ends 80a. Moreover, the minimum distance in the region overlapping the composite 62 is given in terms of the minimum distance between a line that bisects one first coil segment and a line that bisects adjacent fist coil segment.

The first coil segments 80 have portions 80b parallel to each other in the region overlapping the composite 62. The portions 80b run in the track width direction. This arrangement stabilizes the magnetic field induced form the coil 91 to the composite 62.

Note that the first coil segment 80 may have a structure other than that shown in FIG. 14. For example, the first coil segment 80 may have a structure identical to that of the second coil segments 81 shown in FIG. 11 or 13.

A structure in which only the first coil segments 80 are arranged as described above is also included in the scope of the present invention. That is, a structure in which at least one set of adjacent first coil segments 80 has the distance therebetween gradually increasing toward ends of the first coil segments 80 is also included in the scope of the invention.

A coil 92, which has no parallel portions in the region overlapping the composite 62 shown in FIG. 15, may also be employed.

Sixth Embodiment

Figure 16:
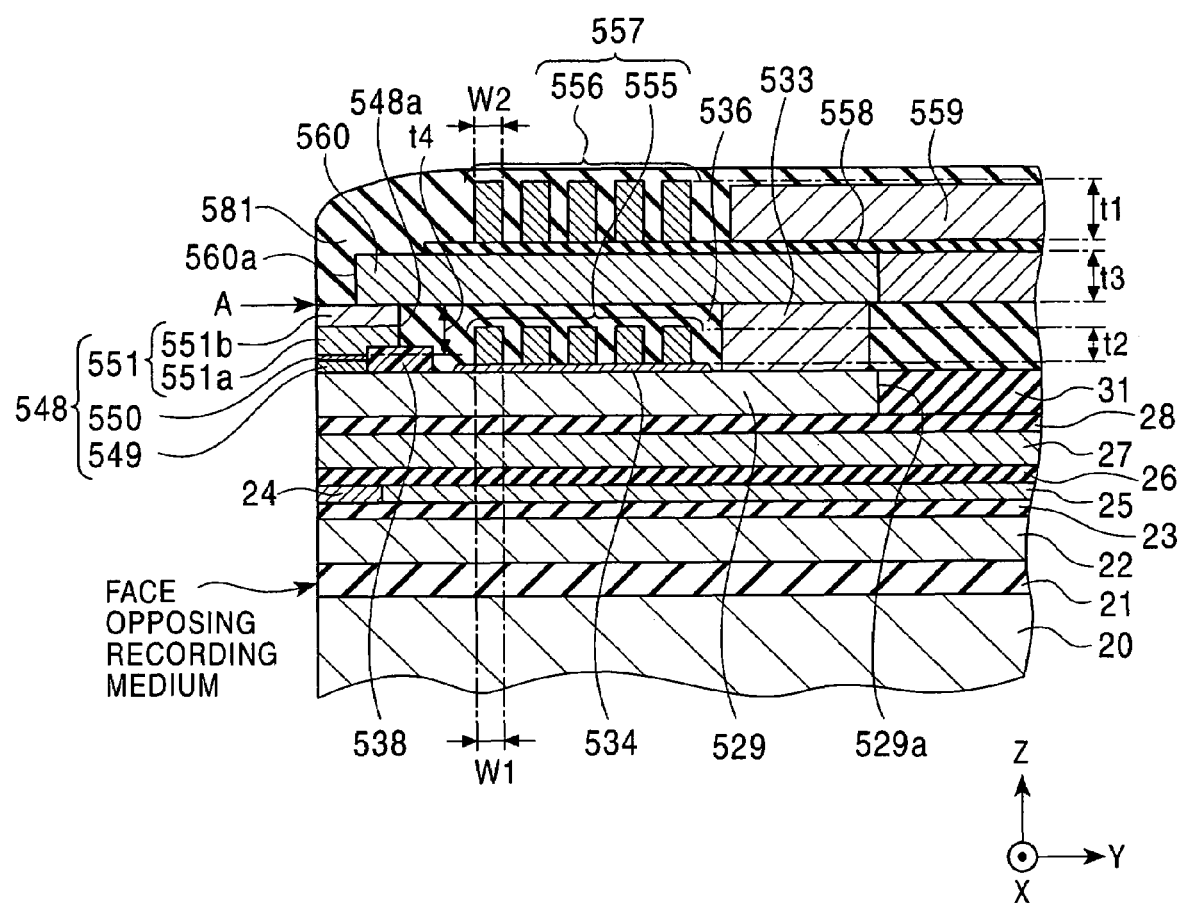
FIG. 16 is a partial vertical cross-sectional view of a thin-film magnetic head according to a sixth embodiment of the present invention.
Figure 17:
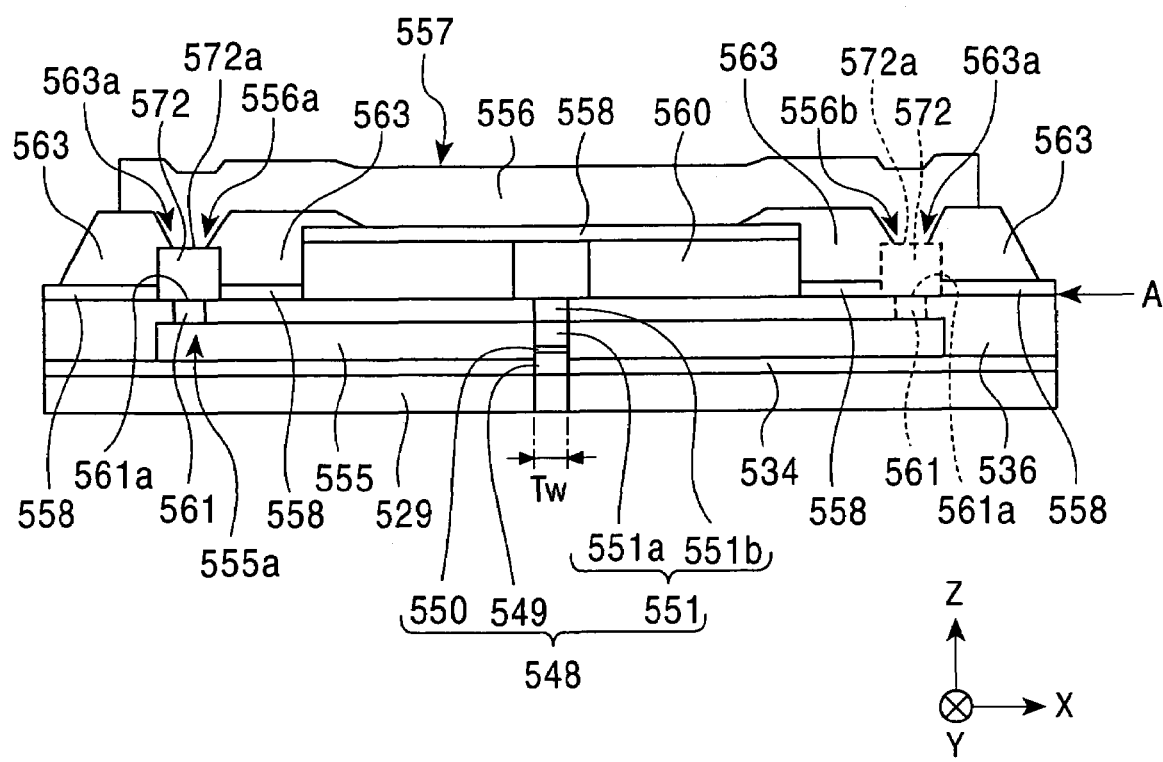
FIG. 17 is a partial front view of the thin-film magnetic head shown in FIG. 16.

FIG. 16 is a partial vertical cross-sectional view of a thin-film magnetic head according to a sixth embodiment of the present invention. FIG. 17 is a partial front view of the thin-film magnetic head shown in FIG. 16 viewed from the opposing face. In FIG. 17, a MR head, an insulating layer 536, a protective layer 581, etc., are omitted from the drawing; a magnetic pole end layer, a first coil segment and a second coil segment closest to the opposing face, and layers near the coil segments are depicted.

The reading head (MR head) constituted from the layers from the lower shield layer 22 to the upper shield layer 27 is identical to the thin-film magnetic heads of the first to fifth embodiment described above.

As shown in FIG. 16, the $Al_2O_3$ separating layer 28 is disposed on the upper shield layer 27. The upper shield layer 27 and the separating layer 28 are not necessarily provided; instead, a lower core layer 529 described below may be formed on the upper gap layer 26. In this case, the lower core layer 529 also functions as the upper shield layer.

In FIG. 16, the lower core layer 529 is formed on the separating layer 28. The lower core layer 529 is composed of a magnetic material such as NiFe alloy. The lower core layer 529 extends face in the height direction (the Y direction) from the opposing face and has a predetermined length in the height direction. A nonmagnetic insulating material layer 31 is formed to extend in the height direction from a rear face 529a of the lower core layer 529. The nonmagnetic insulating material layer 31 is also provided at the two lateral sides of the lower core layer 529 in the track width direction (the X direction). As shown in FIG. 16, the upper surface of the lower core layer 529 is flush with the upper face of the nonmagnetic insulating material layer 31.

As shown in FIG. 16, a magnetic pole end layer 548 is disposed on the lower core layer 529. The magnetic pole end layer 548 extends in the height direction from the opposing face and has a predetermined length in the height direction. The width of the magnetic pole end layer 548 in the track width direction (the X direction) corresponds to the track width Tw. The track width Tw is, for example, 0.5 μm or less.

In the embodiment shown in FIG. 17, the magnetic pole end layer 548 is constituted from three layers, i.e., a lower magnetic pole layer 549, a gap layer 550, and an upper magnetic pole layer 551. These layers will now be described in detail.

The lower magnetic pole layer 549 is formed by plating on the lower core layer 529. The lower magnetic pole layer 549 is the bottommost layer of the magnetic pole end layer 548. The lower magnetic pole layer 549 is composed of a magnetic material and is magnetically connected to the lower core layer 529. The lower magnetic pole layer 549 may or may not be composed of the same material as the lower core layer 529. The lower magnetic pole layer 549 may have a single-layer structure or a multilayer structure.

The nonmagnetic gap layer 550 is disposed on the lower magnetic pole layer 549.

The gap layer 550 is composed of a nonmagnetic metal material and is preferably formed on the lower magnetic pole layer 549 by plating. The nonmagnetic metal material preferably contains at least one selected from NiP, NiReP, NiPd, NiW, NiMo, NiRh, NiRe, Au, Pt, Rh, Pd, Ru, and Cr. The gap layer 550 may have a single-layer structure or a multilayer structure.

The upper magnetic pole layer 551 that magnetically connects to an upper core layer 560 described below is formed on the gap layer 550 by plating. In this embodiment, the upper magnetic pole layer 551 is a combination of a lower sublayer 551a and an upper sublayer 551b. The lower sublayer 551a and the upper sublayer 551b are composed of a magnetic material. The saturation magnetic flux density of the lower sublayer 551a is larger than that of the upper sublayer 551b.

As is previously described above, the lower magnetic pole layer 549, the gap layer 550, and the upper magnetic pole layer 551 can be formed by sequential plating if the gap layer 550 is designed to be made of a nonmagnetic metal material.

A back gap layer 533 formed on the lower core layer 529. The back gap layer 533 extends in the height direction (the Y direction) from a position a predetermined distance away from a rear face 548a of the magnetic pole end layer 548 in the height direction.

The back gap layer 533 is composed of a magnetic material. The material of the back gap layer 533 may be the same as or different from that of the lower core layer 529. The back gap layer 533 may have a single-layer structure or a multilayer structure. The back gap layer 533 is magnetically connected to the lower core layer 529.

A coil insulating underlayer 534 is formed on the lower core layer 529 in region between the magnetic pole end layer 548 and the back gap layer 533. First coil segments 555 parallel to each other extending in the track width direction (the X direction) are formed to align in the height direction. The first coil segments 555 may be shifted toward the height direction with respect to the track width direction (the X direction).

The first coil segments 555 are embedded in the insulating layer 536 composed of an inorganic insulating material such as $Al_2O_3$. As shown in FIG. 16, the upper faces of the magnetic pole end layer 548, the insulating layer 536, and the back gap layer 533 are flush with each other and form a continuous flat face along the reference plane A.

As shown in FIG. 17, a conductive connecting layer 561 is formed to protrude from the upper face of an end portion 555a of each first coil segment 555. The planar shape of the connecting layer 561, i.e., the shape of the cross-section taken along the X-Y plane, may be oval, circular, square, rectangular, rhombic, or the like. The connecting layer 561 is preferably but not necessarily composed of the same material as that of the back gap layer 533. The connecting layer 561 may have a single-layer or multilayer structure. The connecting layer 561 is electrically connected to the end portion 555a of each first coil segment 555. For the purpose of this specification, the phrase "electrically connected" means that electric current flows between two components, layers, and the like regardless of whether they are directly connected or indirectly connected.

As shown in FIG. 17, an upper face 561a of each connecting layer 561 formed on the end portion 555a of the first coil segment 555 is flush with the reference plane A. In other words, in the thin-film magnetic head shown in FIG. 16, the upper surfaces of the magnetic pole end layer 548, the insulating layer 536, the back gap layer 533, and the upper faces 561 of the connecting layers 561 are flush with each other thereby forming a flat face.

As shown in FIG. 16, a Gd defining layer 538 is formed on the lower core layer 529. The Gd defining layer 538 extends in the height direction from the position a predetermined distance away from the opposing face in the height direction (the Y direction). As shown in FIG. 16, the rear end of the upper magnetic pole layer 551 is disposed on the Gd defining layer 538. The gap depth (Gd) is defined as the length of the gap layer 550 in the height direction (the Y direction) from the opposing face up to the Gd defining layer 538.

The upper core layer 560 is formed on the upper magnetic pole layer 551 and the back gap layer 533 by plating. The upper core layer 560 connects the height-side of the lower core layer 529 to the magnetic pole end layer 548 via the back gap layer 533. The upper core layer 560 corresponds to the "magnetic layer" in the present invention.

The upper magnetic pole layer 551 and the upper core layer 560 may be formed of the same material but are preferably formed of different materials. In particular, the saturation magnetic flux density of the upper core layer 560 is preferably lower than that of the upper sublayer 551b of the upper magnetic pole layer 551. The saturation magnetic flux density of the upper core layer 560 is, for example, 1.4 to 1.9 T. The saturation magnetic flux density of the upper magnetic pole layer 551 is, for example, 1.9 to 2.4 T in the lower sublayer and 1.4 to 1.9 T in the upper sublayer.

When the saturation magnetic flux density of the upper core layer 560 is lower than that of the upper magnetic pole layer 551, magnetic recording through leakage magnetic field from the upper core layer 560 can be easily prevented.

As shown in FIG. 17, a conductive bank layer 572 is provided at each side of the composite in the track width direction (the X direction). The bank layers 572 are disposed on the insulating layer 536 and the connecting layers 561, as shown in FIG. 17. The bank layers 572 are electrically connected to the upper faces of the connecting layers 561.

As shown in FIGS. 16 and 17, an insulating layer 558 composed of an insulating material such as $Al_2O_3$ or the like is disposed on the upper core layer 560. The insulating layer 558 is preferably composed of an inorganic insulating material. The insulating layer 558 extends over the insulating layer 536 at the two sides of the upper core layer 560 in the track width direction (the X direction). Moreover, as shown in FIG. 17, an insulating layer 563 composed of an organic insulating material such as resist is formed over the two end portions of the insulating layer 558 in the track width direction (the X direction), the two sides of the upper core layer 560, and near the bank layers 572.

The insulating layer 558 is formed by sputtering an inorganic insulating material, for example, and has a thickness smaller than that of the insulating layer 563 composed of an organic insulating material. In this manner, the distance between the upper core layer 560 and second coil segments 556 described below can be reduced and the magnetic efficiency can be improved. Moreover, the upper core layer 560 can be adequately insulated from the second coil segments 556 at the two sides of the upper core layer 560.

As shown in FIGS. 16 and 17, the second coil segments 556 are disposed on the insulating layers 558 and 563. The second coil segments 556 are parallel to each other and extend in a direction between the track width direction (the X direction) and the height direction (the Y direction). Alternatively, the second coil segments 556 may extend in the track width direction (the X direction). The first coil segments 555 and the second coil segments 556 are not parallel to each other.

As shown in FIG. 17, the insulating layer 563 covers end portions of an upper face 572a of each bank layer 572 but not the central portion of the upper face 572a. In particular, the insulating layer 563 has holes 563a formed in the positions corresponding to the central portions of the upper faces 572a. The holes 563a are formed by exposure and development of a resist layer for forming the insulating layer 563 on the bank layers 572.

As shown in FIG. 17, end portions 556a of the second coil segments 556 in the track width direction (the X direction) fill the holes 563a in the insulating layer 563 on the upper faces 572a of the bank layers 572. The end portions 556a of the second coil segments 556 are electrically connected to the bank layers 572.

Note that the bank layer 572 and the connecting layer 561 illustrated by broken lines in the right side of the drawing of FIG. 17 electrically connect the right end portion of the first coil segment 555, which is disposed behind the first coil segment 555 illustrated in the drawing, to a right end portion 556b of the second coil segment 556 illustrated in the drawing.

In the thin-film magnetic head shown in FIG. 16, the end portions of the first coil segments 555 and the second coil segments 556 disposed above and under the upper core layer 560 in the thickness direction are electrically connected to each other via the connecting layers 561 and the bank layers to form a coil 557.

As shown in FIG. 16, the thin-film magnetic head is provided with the protective layer 581 composed of $Al_2O_3$ or the like and an extraction layer 559. The extraction layer 559 is integral with the second coil segment 556 farthest from the opposing face.

When a recording current is fed to the coil 557, a recording magnetic field is induced in the lower core layer 529 and the upper core layer 560. A leakage magnetic field is generated between the lower magnetic pole layer 549 and the upper magnetic pole layer 551 that oppose each other with the gap layer 550 therebetween. Magnetic signals are recorded on a recording medium, such as a hard disk, through the leakage magnetic field.

In the thin-film magnetic head shown in FIG. 16, the first coil segments 555 are formed in the space defined by the lower core layer 529, the magnetic pole end layer 548, and the back gap layer 533. The first coil segments 555, the connecting layers 561, the bank layers 572, and the second coil segments 556 form the coil 557.

Accordingly, as shown in FIG. 17, the end portions 556a of the second coil segments 556 are uplifted by the bank layers 572. Compared to conventional art, the end portions 556a of the second coil segments 556 do not easily bend downward. In other words, since the resist for forming the second coil segments 556 by patterning is applied on a flat face, the resist can be patterned with high accuracy by exposure and development. The problem of failure in removing the resist at positions corresponding to the end portions 556a of the second coil segments 556 can be avoided. Moreover, the end portions 556a of the second coil segments 556 can be electrically connected to the upper faces 572a of the bank layers 572 with ease and high reliability.

Furthermore, since the end portions 556a of the second coil segments 556 are uplifted by the bank layers 572, the end portions 556a of the second coil segments 556 can be securely insulated from the upper core layer 560.

The bank layers 572 must be composed of a conductive material. In this embodiment, the bank layer 572 is composed of the same material as the upper core layer 560. The upper face of the upper core layer 560 is flush with the upper face of the bank layer 572.

The bank layer 572 is formed at the same time with the upper core layer 560. In particular, after a resist is applied on the insulating layer 536 and the connecting layer 561 to form a resist layer, the patterns for the upper core layer 560 bank layer 572 are formed in the resist layer, and the upper core layer 560 and the bank layer 572 are simultaneously deposited by plating. Since the upper core layer 560 and the bank layer 572 are formed at the same time, the manufacturing process can be simplified.

Alternatively, the upper core layer 560 may be formed separately from the bank layer 572. Thus, it is possible to form bank layer 572 with a material having superior conductivity. For example, the bank layer 572 is preferably constituted from at least one main layer composed of Cu, FeNi, Ni, Au, FeCo, FeCoRh, or FeCoNi. These materials exhibit high conductivity and can be easily used in plating.

Note that these materials are easily oxidized when exposed to air. Since the upper face 572a of the bank layer 572 may be exposed to air before forming the second coil segments 556, and the upper face 572a as well as components near the upper face 572a may be oxidized, at least one protective layer is preferably formed by plating on the layer composed of Cu or Fe or the layer containing Co. The protective layer is preferably composed of a material selected from Ni, CuNi, and NiP.

The shape of the upper core layer 560 in plan view is the same as that of the upper core layer 42 shown in FIG. 5.

In this embodiment, the upper core layer 560 is composed of a material different from that of the upper magnetic pole layer 551 of the magnetic pole end layer 548. In this manner, only the upper magnetic pole layer 551 can be formed of a material having a high saturation magnetic flux density and the upper core layer 560 can be formed of a material having a smaller saturation magnetic flux density than that of the upper magnetic pole layer 551. Since the upper magnetic pole layer 551 and the lower magnetic pole layer 549 having high saturation magnetic flux density is not provided at the back of the Gd defining layer 538, the magnetization flux density can be adequately controlled, the leakage of the magnetic flux from the two sides of the magnetic pole end layer 548 can be minimized, and the S/N ratio of the magnetic head can be improved.

Moreover, since the a front end face 560a of the upper core layer 560 is receded from the opposing face by a predetermined distance, the leakage of the magnetic flux from the upper core layer 560 can be further reduced.

In this embodiment, the thickness t1 of the second coil segments 556 on the upper core layer 560 is larger than the thickness t2 of the first coil segments 555. The length W2 of the second coil segments 556 in a first direction orthogonal to the direction of an electric current flow is larger than the length W2 of the first coil segments 555 in the first direction. The resistance is reduced as a result. In other words, the coil 557 generates less heat, and the magnetic pole end layer 548 and the portion near the magnetic pole end layer 548 can be prevented from projecting toward the recording medium.

In the magnetic head shown in FIGS. 16 and 17, the magnetic path is formed by connecting the magnetic pole end layer 548 and the back gap layer 533 via the flat upper core layer 560. Thus, the length of the magnetic path is shorter than that of the conventional magnetic head in which the core layer is not flat but has a projection. Moreover, when upper face of the upper core layer 560 is flat, the Joule heat generated from the coil 557 can be efficiently released outside the magnetic head.

Since the coil 557 has a toroidal structure wound around the upper core layer 560, the required recording properties can be achieved with a smaller number of coil turns. Since the resistance of the coil can be reduced with the number of turns, the generation of heat from the operating magnetic head can be minimized.

The magnetic pole end layer 548 and the components around the magnetic pole end layer 548 can be prevented from swelling toward the opposing face when the magnetic head generates less heat.

Moreover, the thermal expansion coefficient can be further reduced by forming the insulating layer 536, which covers the coil 557, with an inorganic insulating material.

Seventh Embodiment

Figure 18:
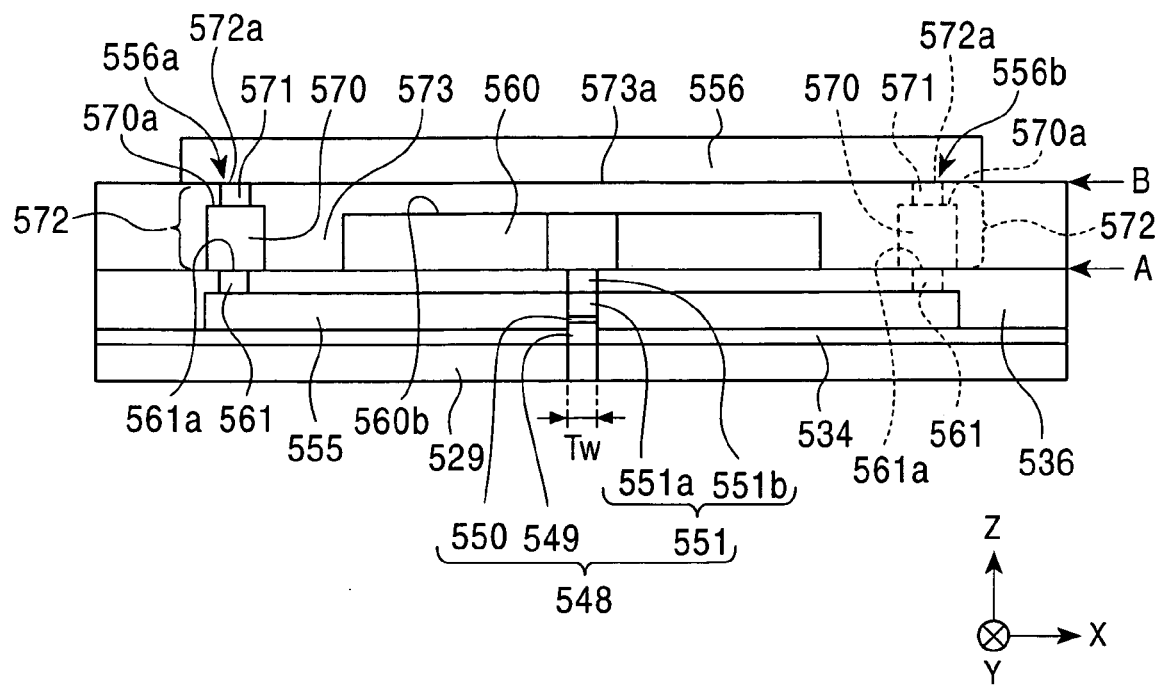
FIG. 18 is a partial front view of a thin-film magnetic head according to a seventh embodiment of the present invention.

FIG. 18 is a partial front view of a thin-film magnetic head according to a seventh embodiment of the present invention. The MR head of the thin-film magnetic head, the protective layer 581, and the like are omitted from the drawing. The drawing shows the first and second coil segments closest to the opposing face, the magnetic pole end portion, and the layers around the magnetic pole end portion.

In the thin-film magnetic head shown in FIG. 18, the layers below the reference plane A are the same as those shown in FIG. 17. In particular, the first coil segments 555 are formed in the space defined by the lower core layer 529, the magnetic pole end layer 548, and the back gap layer 533. The upper faces 561a of the connecting layers 561 projecting from the end portions 555a of the first coil segments 555 are flush with the upper faces of the magnetic pole end layer 548, the insulating layer 536, and the back gap layer 533.

In FIG. 18, the upper core layer 560 is formed on the flat face including the upper faces of the magnetic pole end layer 548, the insulating layer 536, and the back gap layer 533. The upper core layer 560 is accurately formed to have a predetermined shape. The bank layers 572 are disposed at the two sides of the upper core layer 560 in the track width direction (the X direction). The bank layers 572 electrically connect with the connecting layer 561 disposed below.

Each bank layer 572 is constituted from two sublayers stacked with step differences, as shown in FIG. 18. A lower bank sublayer 570 of the bank layer 572 is formed by plating the same material as the upper core layer 560. Alternatively, the lower bank sublayer 570 may be a composite of at least one main layer composed of Cu, FeNi, Ni, Au, FeCo, FeCoRh, or FeCoNi and at least one protective layer composed of Ni, CuNi, or NiP disposed on the main layer.

An upper bank sublayer 571, hereafter also referred to as the "adjustment layer", of the lower bank sublayer 570 adjusts the height of the entire bank layer 572. As shown in FIG. 18, the upper face 572a of the bank layer 572 is located higher than the upper face 560b of the upper core layer 560.

The upper bank sublayer 571 has electrical conductivity and is formed with a platable material. The upper bank sublayer 571 preferably contains at least one layer composed of Cu, FeNi, Ni, Au, FeCo, FeCoRh, or FeCoNi. The upper bank sublayer 571 may be a combination of the main layer containing Cu, Co, or Ni and at least protective layer composed of Ni, CuNi, or NiP disposed on the main layer.

The lower face of the lower bank sublayer 570 is electrically connected to the upper face 561a of the connecting layer 561, and the upper face 570a of the lower bank sublayer 570 is electrically connected to the lower face of the upper bank sublayer 571.

The advantage of having the two-stage bank layer 572 is that the upper face 572a of the lower bank sublayer 570 can be easily made to be at a position higher than the upper face 560b of the upper core layer 560. The upper bank sublayer 571 is formed in a separate step subsequent to the step of forming the lower bank sublayer 570. The upper bank sublayer 571 is formed on the lower bank sublayer 570 by plating.

When the position of the upper face 572a of the lower bank sublayer 570 is higher than that of the upper face 560b of the upper core layer 560, an upper face 573a of an insulating layer 573 (preferably composed of an inorganic insulating material) that entirely covers the upper core layer 560 can be easily planarized so that the upper face 573a of the insulating layer 573 is parallel to the X-Y plane in the drawing. As a result, the second coil segments 556 can be formed on the flat face by patterning at high accuracy, and the end portions 556a and 556b of the second coil segments 556 can be easily and reliably electrically connected to the upper faces 572a of the bank layer 572 exposed in the flat face. Moreover, since the bank layer 572 is taller than the upper core layer 560, the second coil segments 556 can be highly insulated from the upper core layer 560.

Eighth Embodiment

Figure 19:
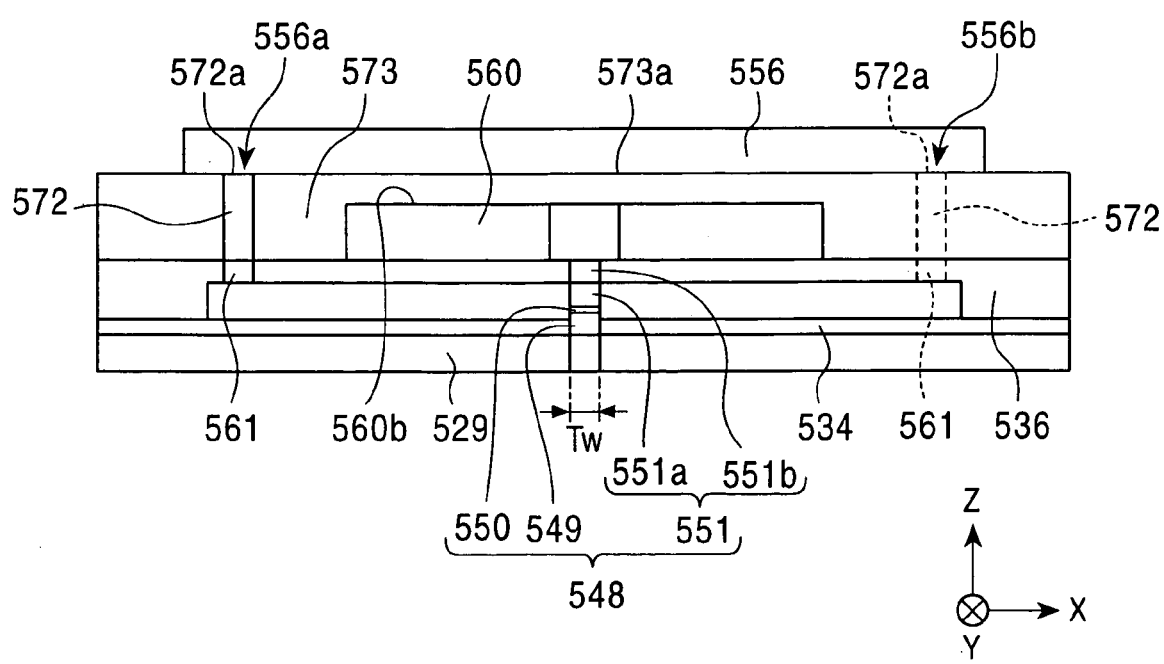
FIG. 19 is a partial front view of a thin-film magnetic head according to an eighth embodiment of the present invention.
Figure 20:
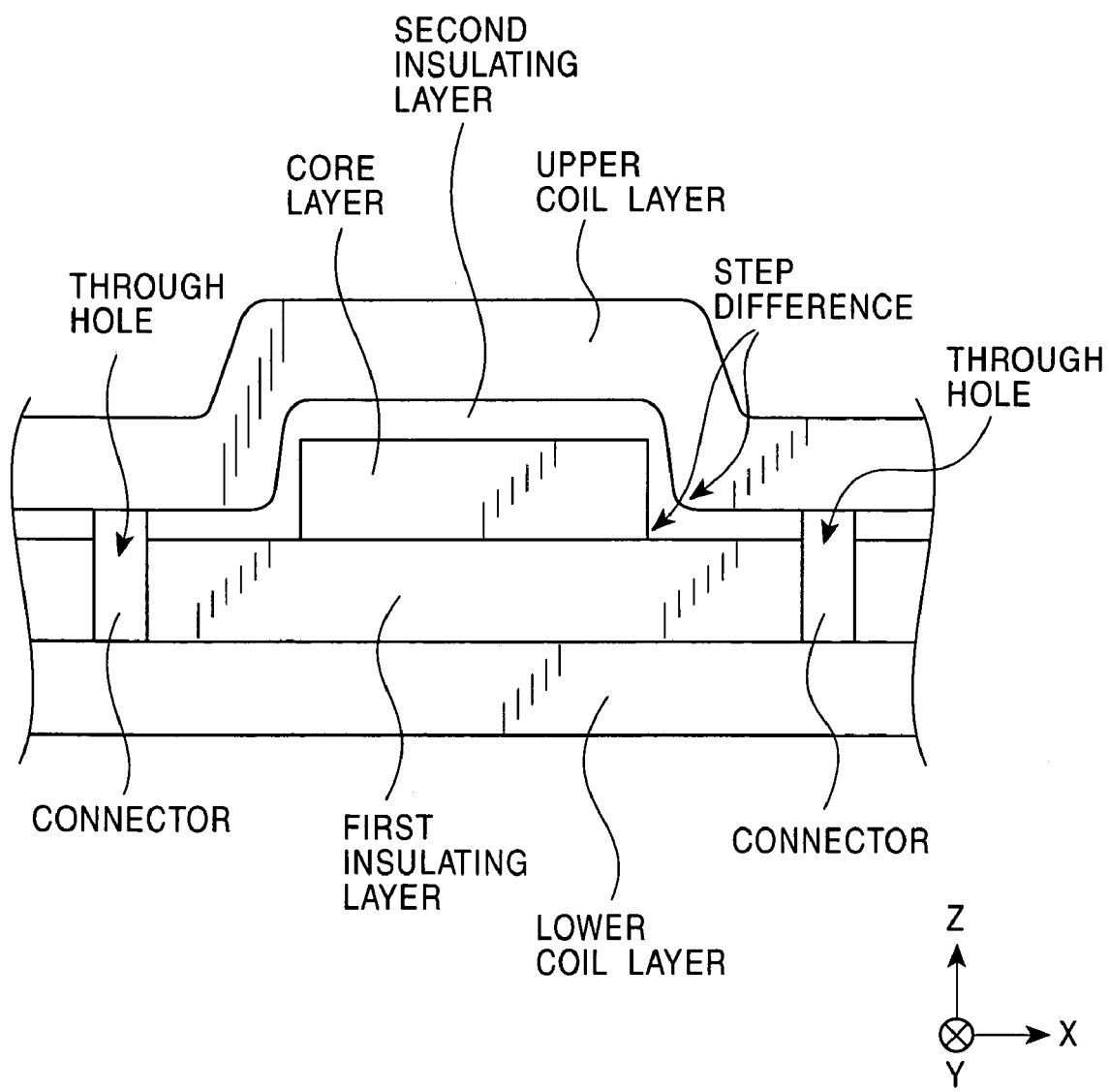
FIG. 20 is a partial front view of a conventional thin-film magnetic head inferred from the patent documents.

The position of the upper face 572a of the bank layer 572 can be made higher than that of the upper face 560b of the upper core layer 560 by employing the structure shown in FIG. 19 (a ninth embodiment of the present invention).

In the thin-film magnetic head shown in FIG. 19, each bank layer 572 is formed on the coil insulating layer 536 at the side of the upper core layer 560 in the track width direction (the X direction). Every area of cross-sections of the bank layer 572 taken parallel to the X-Y plane in the drawing is the same across the bank layer 572. The bank layer 572 may have a single layer structure or multilayer structure formed of one or more conductive material. As shown in FIG. 19, the upper face 572a of the bank layer 572 lies at a higher position than the upper face 560b of the upper core layer 560. The bank layer 572 of FIG. 19 is preferably at least one layer formed of Cu, FeNi, Ni, Au, FeCo, FeCoRh, or FeCoNi and is preferably made by plating. More preferably, the bank layer 572 is a composite structure constituted from at least one main layer formed of Cu, FeNi, Ni, Au, FeCo, FeCoRh, or FeCoNi by plating and at least one protective layer composed of Ni, CuNi, or NiP disposed on the main layer.

Accordingly, in the thin-film magnetic head shown in FIG. 19 also, the second coil segments 556 can be formed on the flat face. Thus, patterning for the second coil segments 556 can be carried out with high accuracy. As a result, the upper faces 572a of the bank layers 572 exposed at the flat face can be easily and reliably electrically connected to the end portions 556a and 556b of the second coil segments 556. Moreover, since the bank layer 572 is taller than the upper core layer 560, the second coil segments 556 can be securely insulated from the upper core layer 560.

The method for making the bank layers 572 shown in FIGS. 18 and 19 are the same as the method for making the bank layers 72 shown in FIGS. 7 and 8.

The thin-film magnetic head described above is installed in, for example, a magnetic head of a hard disk device. The thin-film magnetic head may be incorporated into a floating magnetic head or contact magnetic head. The thin-film magnetic head of the present invention can also be applied to magnetic sensors.

What is claimed is:

1. A thin-film magnetic head having an opposing face that opposes a recording medium, the thin-film magnetic head comprising:

a lower core layer extending from the opposing face in a height direction;

a magnetic layer directly or indirectly connected to the lower core layer at a position a predetermined distance away from the opposing face in the height direction; and a coil toroidally wound around the magnetic layer, the coil comprising:

a plurality of first coil segments that cross over the magnetic layer, the first coil segments being separated from each other with predetermined gaps therebetween in the height direction;

a coil insulating layer covering the first coil segments, the magnetic layer being formed on the coil insulating layer;

a plurality of second coil segments that cross over the magnetic layer, the second coil segments being formed on the coil insulating layer;

a plurality of bank layers disposed at two sides of the magnetic layer in the track width direction, the bank layers being electrically connected with ends of the first coil segments, and a lower magnetic pole layer formed above the lower core layer and a gap layer comprising a nonmagnetic metal material formed on the lower magnetic pole layer, the lower magnetic pole layer and the gap layer being formed by plating, wherein ends of each second coil segment in the track width direction are electrically connected with upper faces of the bank layers to connect ends of the adjacent first coil layers with each other via the second coil segments, thereby forming a toroidal coil, wherein the magnetic layer is formed on the gap layer and functions as an upper magnetic pole layer;

the lower magnetic pole layer, the gap layer, and the magnetic layer constitute a first composite structure;

the width of the first composite structure in the track width direction at the opposing face defines a track width Tw; and each banking layer comprises a second composite structure comprising a first sublayer comprising the same material as the lower magnetic pole layer, a second sublayer comprising the same material as the gap layer, and a third sublayer comprising the same material as the magnetic layer.

2. The thin-film magnetic head according to claim 1, the first composite structure further comprising an upper core layer on the magnetic layer, the upper core layer having a lower saturation magnetic flux density than that of the magnetic layer and being formed by plating, and the second composite structure further comprising a fourth sublayer on the third sublayer, the fourth sublayer comprising the same material as the upper core layer.

3. The thin-film magnetic head according to claim 1, wherein the bank layer comprises a first sublayer comprising the same material as the magnetic layer and an adjustment sublayer stacked on the first sublayer with at least one step difference therebetween, wherein the upper face of the adjustment sublayer is located at a position higher than the upper face of the upper core layer.

4. The thin-film magnetic head according to claim 1, wherein the gap layer and the second sublayer comprise at least one of NiP, NiReP, NiPd, NiW, NiMo, NiRh, Au, Pt, Rh, Pd, Ru, and Cr and are formed by plating.

5. The thin-film magnetic head according to claim 1, wherein the bank layer has a uniform cross sectional area over the entire length, comprises an insulating material, and has a single-layer or multilayer structure, wherein the upper face of the bank layer is located at a position higher than that of the upper face of the magnetic layer.

6. The thin-film magnetic head according to claim 1, wherein the distance between an end of the first coil segment and an adjacent end of the adjacent first coil segment is larger than the minimum distance between the adjacent first coil segments in a region where the first coil segments overlap the magnetic layer, and this relationship is satisfied in at least one set of adjacent first coil segments.

7. The thin-film magnetic head according to claim 6, wherein the first coil segments have portions parallel to each other in the region where the first coil segments overlap the magnetic layer.

8. The thin-film magnetic head according to claim 1, wherein the distance between an end of the second coil segment and an adjacent end of the adjacent second coil segment is larger than the minimum distance between the adjacent second coil segments in a region where the second coil segments overlap the magnetic layer, and this relationship is satisfied in at least one set of adjacent second coil segments.

9. The thin-film magnetic head according to claim 8, wherein the second coil segments have portions parallel to each other in the region where the second coil segments overlap the magnetic layer.

10. The thin-film magnetic head according to claim 1, wherein the length of the second coil segment in a first direction orthogonal to the direction of electric current is larger than the length of the first coil segment in the first direction.

11. The thin-film magnetic head according to claim 1, wherein the thickness of the second coil segment is larger than the thickness of the first coil segment.

12. A thin-film magnetic head having an opposing face that opposes a recording medium, the thin-film magnetic head comprising:

a lower core layer extending from the opposing face in a height direction;

a magnetic layer directly or indirectly connected to the lower core layer at a position a predetermined distance away from the opposing face in the height direction; and a coil toroidally wound around the magnetic layer, the coil comprising:

a plurality of first coil segments that cross over the magnetic layer, the first coil segments being separated from each other with predetermined gaps therebetween in the height direction;

a coil insulating layer covering the first coil segments, the magnetic layer being formed on the coil insulating layer;

a plurality of second coil segments that cross over the magnetic layer, the second coil segments being formed on the coil insulating layer;

a plurality of bank layers disposed at two sides of the magnetic layer in the track width direction, the bank layers being electrically connected with ends of the first coil segments, a lower magnetic pole layer on the lower core layer; a gap layer comprising a nonmagnetic metal material and disposed on the lower magnetic pole layer; and an upper magnetic pole layer disposed on the gap layer, wherein the lower magnetic pole layer, the gap layer, and the upper magnetic pole layer are formed by plating and constitute a magnetic pole end layer, wherein a width of the magnetic pole end layer in the track width direction at the opposing face defines a track width Tw, and the magnetic layer is formed on the magnetic pole end layer, wherein ends of each second coil segment in the track width direction are electrically connected with upper faces of the bank layers to connect ends of the adjacent first coil layers with each other via the second coil segments, thereby forming a toroidal coil, and wherein each bank layer comprises the same material as the magnetic layer.

13. The thin-film magnetic head according to claim 12, wherein the saturation magnetic flux density of the magnetic layer is lower than that of the upper magnetic pole layer.

14. A thin-film magnetic head having an opposing face that opposes a recording medium, the thin-film magnetic head comprising:
- a lower core layer extending from the opposing face in a height direction;
- a magnetic layer directly or indirectly connected to the lower core layer at a position a predetermined distance away from the opposing face in the height direction; and
- a coil toroidally wound around the magnetic layer, the coil comprising:
    - a plurality of first coil segments that cross over the magnetic layer, the first coil segments being separated from each other with predetermined gaps therebetween in the height direction;
    - a coil insulating layer covering the first coil segments, the magnetic layer being formed on the coil insulating layer;
    - a plurality of second coil segments that cross over the magnetic layer, the second coil segments being formed on the coil insulating layer; and
    - a plurality of bank layers disposed at two sides of the magnetic layer in the track width direction, the bank layers being electrically connected with ends of the first coil segments, wherein ends of each second coil segment in the track width direction are electrically connected with upper faces of the bank layers to connect ends of the adjacent first coil layers with each other via the second coil segments, thereby forming a toroidal coil, and wherein the bank layer comprises a composite structure comprising at least one layer comprising Cu, FeNi, Ni, Au, FeCo, FeCoRh, or FeCoNi and at least one protective layer comprising Ni, CuNi, or NiP.

15. The thin-film magnetic head according to claim 14, wherein the bank layer further comprises an adjustment sublayer stacked on the composite structure with at least one step difference therebetween, wherein the upper face of the adjustment sublayer is located at a position higher than the upper face of the magnetic layer.

* * * * *